(12) United States Patent
Du et al.

(10) Patent No.: US 12,277,647 B2
(45) Date of Patent: Apr. 15, 2025

(54) METHOD FOR PROCESSING THREE-DIMENSIONAL DATA AND DEVICE

(71) Applicant: HUAWEI TECHNOLOGIES CO., LTD., Guangdong (CN)

(72) Inventors: Yunkai Du, Shenzhen (CN); Yilong Chen, Shenzhen (CN); Yang Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 104 days.

(21) Appl. No.: 18/187,771

(22) Filed: Mar. 22, 2023

(65) Prior Publication Data
US 2023/0222732 A1 Jul. 13, 2023

Related U.S. Application Data

(63) Continuation of application No. PCT/CN2021/096589, filed on May 28, 2021.

(30) Foreign Application Priority Data

Sep. 23, 2020 (CN) .......................... 202011010600.8

(51) Int. Cl.
*G06T 17/00* (2006.01)
*G06T 5/20* (2006.01)

(52) U.S. Cl.
CPC ................ *G06T 17/00* (2013.01); *G06T 5/20* (2013.01); *G06T 2207/20084* (2013.01)

(58) Field of Classification Search
CPC . G06T 17/00; G06T 5/20; G06T 2207/20084; G06N 3/045; G06N 3/063; G06N 3/0464; G06F 16/2455; G06F 16/284
See application file for complete search history.

(56) References Cited

U.S. PATENT DOCUMENTS

| | | | |
|---|---|---|---|
| 2019/0156206 A1* | 5/2019 | Graham | G06N 3/08 |
| 2019/0171926 A1* | 6/2019 | Chen | G06N 3/04 |
| 2021/0216871 A1* | 7/2021 | Zhang | G06N 3/063 |

OTHER PUBLICATIONS

Benjamin Graham, Martin Engelcke, Laurens van der Maaten; "3D Semantic Segmentation with Submanifold Sparse Convolutional Networks", Proceedings of the IEEE Conference on Computer Vision and Pattern Recognition (CVPR), Nov. 29, 2017, total 11 pages.

(Continued)

*Primary Examiner* — Chong Wu
(74) *Attorney, Agent, or Firm* — WOMBLE BOND DICKINSON (US) LLP

(57) ABSTRACT

This application discloses a method for processing three-dimensional data. The method may be applied to the field of intelligent driving. The method includes: for a target convolution operator in a convolutional neural network, a corresponding intermediate result may be first calculated by using one or more background values of three-dimensional data; then, when first data is processed, a corresponding intermediate result may be searched for based on a background identifier in a sparse distribution diagram; and further, a value of a voxel of second data is obtained based on the intermediate result, with no need to repeat a process of convolution processing for a plurality of times, thereby implementing convolution acceleration.

20 Claims, 19 Drawing Sheets

(56) References Cited

OTHER PUBLICATIONS

Shail Dave, et al., "Hardware Acceleration of Sparse and Irregular Tensor Computations of ML Models: A Survey and Insights", Proceedings of the IEEE, vol. 109, No. 10, Jul. 2, 2020 (Jul. 2, 2020), pp. 1706-1752, total 58 pages.

Sangyeob Kim, et al., "A Power-Efficient CNN Accelerator With Similar Feature Skipping for Face Recognition in Mobile Devices", IEEE Transactions on Circuits and Systems—I: Regular Papers, vol. 67, No. 4, Apr. 2020, total 13 pages.

\* cited by examiner

METHOD FOR PROCESSING THREE-DIMENSIONAL DATA AND DEVICE

CROSS-REFERENCE TO RELATED APPLICATIONS

This application is a continuation of International Application No. PCT/CN2021/096589, filed on May 28, 2021, which claims priority to Chinese Patent Application No. 202011010600.8, filed on Sep. 23, 2020. The disclosures of the aforementioned applications are hereby incorporated by reference in their entireties.

TECHNICAL FIELD

This application relates to the field of computer technologies, and in particular, to a method for processing three-dimensional (3D) data, a method for constructing a convolutional neural network, and a device.

BACKGROUND

A convolutional neural network (CNN) has been widely used in computer vision in recent years, and the CNN is used to perform tasks such as classification, detection, or segmentation in computer vision. These tasks are generally performed on images through two-dimensional (2D) convolution. In two-dimensional convolution, only a spatial dimension feature of a single static image is extracted. In a scenario with a 3D data feature, such as a video data scenario or a 3D image scenario, 3D convolution may be used.

Deep convolutional neural networks (such as ResNet and ForkNet) have a wide application prospect in a 3D field. However, a biggest challenge for the deep convolutional neural networks is that computing complexity of three-dimensional convolution is very high, and a computing power requirement of a three-dimensional convolutional neural network is usually more than 10 times higher than that of a two-dimensional convolutional neural network of a same scale. An inference side is especially very sensitive to latency. A slow inference speed of the network may cause frame freezing, which directly affects user experience on a device side. In a self-driving field with a higher latency requirement, a large amount of three-dimensional data is suitable for processing by using the three-dimensional convolutional neural network. However, because performance of the three-dimensional convolutional neural network cannot meet a real-time performance requirement, the three-dimensional convolutional neural network cannot be used.

Currently, accelerating a process of processing three-dimensional data by the three-dimensional convolutional neural network becomes an urgent problem to be resolved.

SUMMARY

Embodiments of this application provide a method for processing three-dimensional data, to improve a computing speed of three-dimensional convolution. Embodiments of this application further provide a corresponding method for constructing a convolutional neural network, a corresponding device, a system, a computer-readable storage medium, a computer program product, and the like.

A first aspect of this application provides a method for processing three-dimensional data. The method may be applied to the field of intelligent driving. The method includes: inputting first data, at least one first background value of the first data, and a first sparse distribution diagram of the first data into a target convolution operator of a convolutional neural network, where the convolutional neural network includes at least one first convolution operator, and the target convolution operator is any one of the at least one first convolution operator; the first data includes a plurality of first voxels, the at least one first background value indicates at least one background in the first data, and the at least one first background value is in a one-to-one correspondence with the at least one background; the first sparse distribution diagram describes sparse distribution of the plurality of first voxels by using a background identifier and a non-background identifier, the background identifier indicates that a first voxel that corresponds to the background identifier and that is in the first data is a background, and the non-background identifier indicates that a first voxel that corresponds to the non-background identifier and that is in the first data is a non-background; searching, based on a background identifier of a background point that corresponds to a first voxel indicating a background in the first data and that is in the first sparse distribution diagram, a correspondence for an intermediate result corresponding to the background identifier of the background point, where the correspondence indicates a relationship between an intermediate result of each of the at least one first background value and a background identifier corresponding to each of the at least one first background value, an intermediate result of one first background value in the at least one first background value is obtained through calculation by using the first background value and a convolution kernel of the target convolution operator, and the intermediate result corresponding to the background identifier of the background point is used to determine a value of a second voxel in second data; and controlling the target convolution operator to output the second data, where the second data includes a plurality of second voxels.

In the first aspect, the convolutional neural network is a three-dimensional convolutional neural network, such as ResNet or ForkNet. The convolutional neural network is a neural network including a plurality of three-dimensional convolution operators, and is used to process three-dimensional data. The three-dimensional data is data in three dimensions, and the three-dimensional data is usually sparse data. The three-dimensional data may be video data, voice data, or text data. The sparse data is data with a large quantity of repeating elements, and the repeating elements are referred to as a background of the data.

In this application, the first data is a multidimensional array (tensor) of video data, voice data, or text data. There is at least one first background value, that is, one or more first background values. "A plurality of" in this application includes two or more, or may be described as at least two. Generally, the "background value" is a value used to describe a repeating element background, and may be 0, 1, 2, ..., 101, 102, 103, or any other value. For example, a decimal, a negative number, or a complex number may all be used as a background value. One piece of three-dimensional data may include one or more backgrounds, and a background value may be set for each background. For example, when air is used as a background, a background value of the air background is set to 101; when an object surface is used as a background, a background value of the object surface background is set to 102; and when an area that is not detected by a depth camera is used as a background, a background value of the background of the area that is not detected is set to 103. Sparse distribution means background distribution of the three-dimensional data. The background distribution may be represented by a background identifier of each voxel. The background identifier may be a value or a character that numbers the background, for example, 1, 2, 3, A, B, or C. A background identifier is associated with a background value. For example, a background identifier 1 is associated with the background value 101, a background identifier 2 is associated with the background value 102, and a background identifier 3 is associated with the background value 103.

In this application, the three-dimensional data includes a voxel. The voxel is an abbreviation of a volume element, indicates a smallest unit of the three-dimensional data in spatial segmentation, and is similar to a pixel in two-dimensional data. The first voxel is a voxel in the first data. The second voxel is a voxel in the second data.

In this application, the first sparse distribution diagram is a sparse distribution diagram corresponding to the first data. A unit in the first sparse distribution diagram may be referred to as a "point". A point corresponding to a first voxel indicating a background may be referred to as a "background point", a point corresponding to a first voxel indicating a non-background may be referred to as a "non-background point", and the non-background point may also be referred to as a "dense point". The background point is marked with a background identifier, for example, 1, 2, or 3. The non-background point is marked with a unified non-background identifier.

In this application, the background identifier corresponds to the first background value. There are three first background values 101, 102, and 103, and background identifiers 1, 2, and 3. A correspondence may be in the following manner: 101→1, 102→2, and 103→3. Correspondences between the first background values and the background identifiers are usually implicit correspondences based on their respective orders, or may be displayed in a form of a table or a mapping relationship. The non-background identifier may be uniformly represented by M, where M is an abbreviation of Max, and represents a non-background point.

In this application, before an intermediate result is searched for from a first correspondence, an intermediate result of each first background value and the convolution kernel is calculated, for example, an intermediate result 1 of 101 and the convolution kernel, an intermediate result 2 of 102 and the convolution kernel, and an intermediate result 3 of 103 and the convolution kernel. Because the first background value corresponds to the background identifier, a correspondence between a background identifier and a convolution result may be established, for example, 1→the intermediate result 1, 2→the intermediate result 2, and 3→the intermediate result 3. Generally, the first data includes many first voxels. In a conventional technology, a process of performing convolution processing on the first data is a process of performing calculation on values of the first voxels and the convolution kernel one by one. However, most of the first voxels indicate a background, and values of the first voxels indicating a background have much repetition. A speed of calculation performed on the values of the first voxels and the convolution kernel one by one is very low. However, in the first aspect, for each first background value, calculation is first performed with the convolution kernel to obtain an intermediate result, and then a correspondence between the intermediate result and a background identifier is stored. During convolution processing of the first data, for the first voxel indicating a background in the first data, the intermediate result may be directly found by searching the correspondence, and then the value of the second voxel in the second data may be obtained by using the intermediate result. There is no need to perform a large amount of calculation on a value of each first voxel and the convolution kernel, thereby reducing calculation overheads and implementing convolution acceleration. For example, there are 1000 first voxels in the first data, where there are 950 first voxels indicating a background, and there are only three first background values indicating different background types in the 950 first voxels indicating a background. In this case, in the first aspect, calculation may be performed on the three first background values and the convolution kernel, and then a search operation is performed in a correspondence, with no need to perform calculation on all 950 values and the convolution kernel. A search speed is much faster than a speed of calculation with the convolution kernel. Therefore, overheads may be greatly reduced, and a convolution processing speed is greatly improved.

In a possible implementation of the first aspect, the convolutional neural network includes an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is from an operator that inputs the at least one first background value into a third convolution operator, and a position of the third convolution operator in the background inference subnet corresponds to the position of the target convolution operator in the operation subnet.

In this possible implementation, the at least one first background value and the first sparse distribution diagram may be input into the target convolution operator through cooperation of three subnets: the operation subnet, the background inference subnet, and the sparse distribution inference subnet, to ensure that the target convolution operator in the operation subnet may implement convolution acceleration when processing three-dimensional data.

In a possible implementation of the first aspect, the convolutional neural network includes an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is preconfigured for the target convolution operator.

In this possible implementation, the first background value may be preconfigured, so that the at least one first background value and the first sparse distribution diagram may be input into the target convolution operator through cooperation of two subnets: the operation subnet and the sparse distribution inference subnet, to ensure that the target convolution operator in the operation subnet may implement convolution acceleration when processing three-dimensional data. In addition, the first background value does not need to be calculated by using the background inference subnet, thereby saving a computing resource of a device on an inference side.

In a possible implementation of the first aspect, intermediate results in the correspondence are results obtained through calculation on the first background value at different positions of the convolution kernel. The operation of searching, based on a background identifier of a background point that corresponds to a first voxel indicating a background in the first data and that is in the first sparse distribution diagram, a correspondence for an intermediate result corresponding to the background identifier of the background point includes: for each first voxel that indicates a background and that is in a sliding window of the first data, searching, based on a background identifier that corresponds to each first voxel indicating a background and that is in the first sparse distribution diagram and a position that is of each first voxel indicating a background and that is in the sliding window, the correspondence for an intermediate result corresponding to the background identifier at a corresponding position, where a size of the sliding window of the first data is the same as a size of the convolution kernel of the target convolution operator.

In this possible implementation, in a three-dimensional convolution operator, a convolution kernel is usually in a form of a multidimensional array. A size of the convolution kernel is usually preset, for example, 3*3*1*L, where a first 3 represents a width, a second 3 represents a height, 1 represents a depth, and L represents a quantity of channel dimensions. In a process of performing convolution processing on three-dimensional video data, a channel dimension usually represents a color. Certainly, the channel dimension may alternatively have another definition. In a channel dimension, the convolution kernel is like a sliding window of three-dimensional data in the channel dimension. If the convolution kernel has a plurality of channel dimensions, when an intermediate result of a background value is calculated, for any one of nine positions: 3*3*1 positions, the background value may be multiplied by vectors at a corresponding position in the L channel dimensions, and then products at the position in the L channel dimensions are accumulated, to obtain an intermediate result at the position. The sliding window of the three-dimensional data means a window that may slide on a plurality of voxels of the three-dimensional data, and the window may cover a plurality of voxels at a time. For example, if a size of the sliding window is 3*3, the sliding window may cover nine voxels by sliding once. This may also be described as a description that the sliding window covers nine voxels. In this way, when an intermediate result is searched for, a corresponding intermediate result may be found based on a position of a first voxel in the sliding window and a corresponding background identifier, thereby improving a search speed and further improving a speed of processing the three-dimensional data.

In a possible implementation of the first aspect, the method further includes: accumulating intermediate results of the first voxel that indicates a background and that is in the sliding window of the first data, to obtain a value of one second voxel, where all first voxels in the sliding window of the first data indicate a background.

In this possible implementation, the value of the second voxel may be obtained only by accumulating intermediate results. This improves a speed of processing three-dimensional data, compared with a case in which the value of the second voxel can be obtained through calculation with the convolution kernel each time.

In a possible implementation of the first aspect, the method further includes: accumulating intermediate results of the first voxel that indicates a background and that is in the sliding window of the first data, and further adding an intermediate result of a first voxel that indicates a non-background, to obtain a value of one second voxel, where the intermediate result of the first voxel that indicates a non-background is obtained through calculation by using a value of the first voxel that indicates a non-background and the convolution kernel.

In this possible implementation, the value of the second voxel may be obtained through calculation on only a few first voxels indicating a non-background and the convolution kernel, and then performing accumulation with the intermediate results of the first voxel indicating a background. This improves a speed of processing three-dimensional data, compared with a case in which the value of the second voxel can be obtained through calculation with the convolution kernel each time.

In a possible implementation of the first aspect, the target convolution operator is a $1^{st}$ convolution operator in the operation subnet, and in this case, the first sparse distribution diagram is obtained by scanning each first voxel in the first data one by one by an initialization operator in the sparse distribution inference subnet; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

In a possible implementation of the first aspect, the at least one first background value of the first data is represented in a form of a one-dimensional array.

In a possible implementation of the first aspect, the target convolution operator is not a $1^{st}$ convolution operator in the operation subnet, and in this case, the first data has a plurality of channel dimensions, and a sparse distribution diagram of sub-data in each channel dimension is the same as the first sparse distribution diagram of the first data.

In a possible implementation of the first aspect, first background values of sub-data in different channel dimensions are different.

In this possible implementation, the first background values are different, and an effect of three-dimensional data obtained after convolution processing is better.

In a possible implementation of the first aspect, the at least one first background value of the first data is represented in a form of a two-dimensional array.

In a possible implementation of the first aspect, the first data is a multidimensional array of video data, voice data, or text data.

A second aspect of this application provides a method for processing three-dimensional data, including: inputting first data into a target convolution operator of a convolutional neural network, where the convolutional neural network includes at least one first convolution operator, and the target convolution operator is any one of the at least one first convolution operator; the first data includes a plurality of first voxels, and at least one second background value obtained through convolution processing on at least one first background value of the first data and a second sparse distribution diagram obtained through a row identifier check operation on a first sparse distribution diagram are further input into the target convolution operator; the identifier check operation is checking that identifiers of points covered by a sliding window of the first sparse distribution diagram are all the same or not all the same, and the identifiers include a background identifier and a non-background identifier; the at least one first background value indicates at least one background in the first data, and the at least one first background value is in a one-to-one correspondence with the at least one background; the first sparse distribution diagram describes sparse distribution of the plurality of first voxels by using the background identifier and the non-background identifier, the background identifier indicates that a first voxel that corresponds to the background identifier and that is in the first data is a background, and the non-background identifier indicates that a first voxel that corresponds to the non-background identifier and that is in the first data is a non-background; searching, based on a background identifier that indicates a background point and that is in the second sparse distribution diagram, for a second background value corresponding to the background identifier of the background point, where the second background value corresponding to the background identifier of the background point is a value of a second voxel that corresponds to the background point and that is in second data; and controlling the target convolution operator to output the second data, where the second data includes a plurality of second voxels.

Content that is in the second aspect and that is the same as that in the first aspect is not described again. A process of obtaining the second background value from the first background value may be achieved by performing convolution processing on the first background value and a convolution kernel of a second convolution operator. In a process of obtaining the second sparse distribution diagram based on the first sparse distribution diagram, an identifier of the second sparse distribution diagram may be obtained only by checking whether identifiers in the sliding window are all the same, thereby saving a computing resource. In the second aspect, after receiving the first data, the second background value, and the second sparse distribution diagram, the target convolution operator may directly search for a corresponding second background value by using a background identifier in the second sparse distribution diagram. The found second background value is a value of a second voxel at a position corresponding to the background identifier. It may be learned that, in the solution provided in this embodiment of this application, a corresponding value may be directly found for a second voxel indicated by a background identifier in the second sparse distribution diagram, and no convolution processing process needs to be performed, thereby implementing convolution acceleration.

In a possible implementation of the second aspect, the method further includes: for a non-background point in the second sparse distribution diagram, searching, based on a background identifier of a target point in the first sparse distribution diagram, a correspondence for an intermediate result corresponding to the background identifier of the target point, where the target point is a point that indicates a background, that corresponds to the non-background point in the second sparse distribution diagram, and that is located in the first sparse distribution diagram; the correspondence indicates a relationship between an intermediate result of each of the at least one first background value and a background identifier corresponding to each of the at least one first background value, and an intermediate result of one first background value in the at least one first background value is obtained through calculation by using the first background value and a convolution kernel of the target convolution operator; and intermediate results in the correspondence are results obtained through calculation on the first background value at different positions of the convolution kernel, and the intermediate result corresponding to the background identifier of the target point is used to determine a value of a second voxel corresponding to the non-background point in the second sparse distribution diagram.

In this possible implementation, the value of the second voxel in the second data may be obtained through two searches, so that a speed of processing three-dimensional data may be further improved.

In a possible implementation of the second aspect, the convolutional neural network includes an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value is from an operator that inputs the at least one first background value into a third convolution operator, the at least one second background value is obtained through convolution processing on the at least one first background value by the third convolution operator, and a position of the third convolution operator in the background inference subnet corresponds to the position of the target convolution operator in the operation subnet.

In a possible implementation of the second aspect, the convolutional neural network includes an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value and the at least one second background value are preconfigured for the target convolution operator.

In a possible implementation of the second aspect, the method further includes: accumulating found intermediate results corresponding to all target points, to obtain the value of the second voxel corresponding to the non-background point, where all points that correspond to the non-background point and that are located in the first sparse distribution diagram are points indicating a background.

In a possible implementation of the second aspect, the method further includes: accumulating found intermediate results corresponding to all target points, and further adding an intermediate result corresponding to a dense point that corresponds to the non-background point and that is located in the first sparse distribution diagram, to obtain the value of the second voxel corresponding to the non-background point, where the dense point is a point that indicates a non-background and that is in the first sparse distribution diagram, and the intermediate result corresponding to the dense point is obtained through calculation by using the convolution kernel and a value of a first voxel that indicates a non-background, that corresponds to the dense point, and that is in the first data.

In a possible implementation of the second aspect, the target convolution operator is a $1^{st}$ convolution operator in the operation subnet, and in this case, the first sparse distribution diagram is obtained by scanning each first voxel in the first data one by one by an initialization operator in the sparse distribution inference subnet; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

In a possible implementation of the second aspect, the at least one first background value of the first data is represented in a form of a one-dimensional array, and the at least one second background value is represented in a form of a two-dimensional array.

In a possible implementation of the second aspect, the target convolution operator is not a $1^{st}$ convolution operator in the operation subnet, and in this case, the first data has a plurality of channel dimensions, and a sparse distribution diagram of sub-data in each channel dimension is the same as the first sparse distribution diagram of the first data.

In a possible implementation of the second aspect, first background values of sub-data in different channel dimensions are different.

In a possible implementation of the second aspect, the at least one first background value of the first data is represented in a form of a two-dimensional array.

In a possible implementation of the second aspect, the first data is a multidimensional array of video data, voice data, or text data.

In the solutions described in any one of the second aspect and the possible implementations of the second aspect, a similar solution described in any one of the first aspect and the possible implementations of the first aspect is not described in the second aspect. For understanding, refer to the related description in the similar solution described in any one of the first aspect and the possible implementations of the first aspect.

A third aspect of this application provides a method for constructing a convolutional neural network, including: obtaining an initial convolutional neural network, where the initial convolutional neural network includes an operation subnet, and the operation subnet includes at least one first convolution operator; obtaining, through replication, a sparse distribution inference subnet based on the operation subnet; and constructing at least one of a first input relationship and a second input relationship, where the first input relationship is an input relationship from a second convolution operator in the sparse distribution inference subnet to a first convolution operator at a corresponding position, and the second input relationship is an input relationship from an operator that is in the sparse distribution inference subnet and that inputs data into the second convolution operator to the first convolution operator at the corresponding position, to obtain a target convolutional neural network.

In the third aspect, the operation subnet may be the entire initial convolutional neural network, or may be a part of the initial convolutional neural network. The first convolution operator is a three-dimensional convolution operator, and these three-dimensional convolution operators and other operators are arranged based on a network structure, so that three-dimensional data may be processed. A network structure of the sparse distribution inference subnet is the same as a network structure of the operation subnet. The sparse distribution inference subnet is used to infer a sparse distribution diagram of three-dimensional data. According to the third aspect, based on the initial convolutional neural network used to process only three-dimensional data, the sparse distribution inference subnet with the same structure is added for the operation subnet. In this way, it may be ensured that in a process in which convolution operators at different positions in the operation subnet perform convolution processing on the three-dimensional data, a sparse distribution diagram at a corresponding position may be obtained from the sparse distribution inference subnet, and a corresponding background value may be obtained from a preconfigured background value. Therefore, it may be ensured that the target convolutional neural network constructed in this application may improve a convolution processing speed.

In a possible implementation of the third aspect, before the obtaining a target convolutional neural network, the method further includes: obtaining, through replication, a background inference subnet based on the operation subnet; and constructing at least one of a third input relationship and a fourth input relationship, where the third input relationship is an input relationship from a third convolution operator in the background inference subnet to a first convolution operator at a corresponding position, the fourth input relationship is an input relationship from an operator that is in the background inference subnet and that inputs data into the third convolution operator to the first convolution operator at the corresponding position, the first input relationship corresponds to the third input relationship, and the second input relationship corresponds to the fourth input relationship.

In this possible implementation, a network structure of the background inference subnet is the same as the network structure of the operation subnet. The background inference subnet is used to infer a background value of three-dimensional data. The background inference subnet is added, so that when the three-dimensional data is processed, a background value may be obtained from the background inference subnet. Therefore, it may be ensured that the target convolutional neural network constructed in this application may improve a convolution processing speed.

In a possible implementation of the third aspect, the method further includes: determining the operation subnet from the initial convolutional neural network, where input data of all operators in the operation subnet has same sparse distribution in a channel dimension, output data of all the operators has same sparse distribution in the channel dimension, and the channel dimension represents a dimension different from three-dimensional space.

In this possible implementation, after the operation subnet is determined, replication may be directly performed based on the determined operation subnet; or the operation subnet may be cut from the initial convolutional neural network, and then replication is performed. After the sparse distribution inference subnet and the background inference subnet are obtained through replication, and the input relationship between operators in the three subnets is established, a remaining network other than the operation subnet in the initial convolutional neural network may be spliced to a position of the operation subnet that is before separation.

A fourth aspect of this application provides an apparatus for processing three-dimensional data. The apparatus has a function of implementing the method according to any one of the first aspect or the possible implementations of the first aspect. The function may be implemented by hardware, or may be implemented by hardware executing corresponding software. The hardware or the software includes one or more modules corresponding to the foregoing function, for example, a first processing unit, a second processing unit, and a third processing unit. The three processing units may alternatively be implemented by using one or two processing units.

A fifth aspect of this application provides an apparatus for processing three-dimensional data. The apparatus has a function of implementing the method according to any one of the second aspect or the possible implementations of the second aspect. The function may be implemented by hardware, or may be implemented by hardware executing corresponding software. The hardware or the software includes one or more modules corresponding to the foregoing function, for example, a first processing unit, a second processing unit, and a third processing unit. The three processing units may alternatively be implemented by using one or two processing units.

A sixth aspect of this application provides an apparatus for constructing a convolutional neural network. The apparatus has a function of implementing the method according to any one of the third aspect or the possible implementations of the third aspect. The function may be implemented by hardware, or may be implemented by hardware executing corresponding software. The hardware or the software includes one or more modules corresponding to the foregoing function, for example, an obtaining unit, a first processing unit, and a second processing unit. The two processing units may alternatively be implemented by using one processing unit.

A seventh aspect of this application provides a computer device. The computer device includes at least one processor, a memory, an input/output (I/O) interface, and computer-executable instructions that are stored in the memory and that may be run on the processor. When the computer-executable instructions are executed by the processor, the processor performs the method according to any one of the first aspect or the possible implementations of the first aspect.

An eighth aspect of this application provides a computer device. The computer device includes at least one processor, a memory, an input/output (I/O) interface, and computer-executable instructions that are stored in the memory and that may be run on the processor. When the computer-executable instructions are executed by the processor, the processor performs the method according to any one of the second aspect or the possible implementations of the second aspect.

A ninth aspect of this application provides a computer device. The computer device includes at least one processor, a memory, an input/output (I/O) interface, and computer-executable instructions that are stored in the memory and that may be run on the processor. When the computer-executable instructions are executed by the processor, the processor performs the method according to any one of the third aspect or the possible implementations of the third aspect.

A tenth aspect of this application provides a computer-readable storage medium storing one or more computer-executable instructions. When the computer-executable instructions are executed by a processor, the processor performs the method according to any one of the first aspect or the possible implementations of the first aspect.

An eleventh aspect of this application provides a computer-readable storage medium storing one or more computer-executable instructions. When the computer-executable instructions are executed by a processor, the processor performs the method according to any one of the second aspect or the possible implementations of the second aspect.

A twelfth aspect of this application provides a computer-readable storage medium storing one or more computer-executable instructions. When the computer-executable instructions are executed by a processor, the processor performs the method according to any one of the third aspect or the possible implementations of the third aspect.

A thirteenth aspect of this application provides a computer program product storing one or more computer-executable instructions. When the computer-executable instructions are executed by a processor, the processor performs the method according to any one of the first aspect or the possible implementations of the first aspect.

A fourteenth aspect of this application provides a computer program product storing one or more computer-executable instructions. When the computer-executable instructions are executed by a processor, the processor performs the method according to any one of the second aspect or the possible implementations of the second aspect.

A fifteenth aspect of this application provides a computer program product storing one or more computer-executable instructions. When the computer-executable instructions are executed by a processor, the processor performs the method according to any one of the third aspect or the possible implementations of the third aspect.

A sixteenth aspect of this application provides a chip system. The chip system includes at least one processor, and the at least one processor is configured to implement a function in any one of the first aspect or the possible implementations of the first aspect. In a possible embodiment, the chip system may further include a memory. The memory is configured to store program instructions and data for an apparatus for processing three-dimensional data. The chip system may include a chip, or may include a chip and another discrete component.

A seventeenth aspect of this application provides a chip system. The chip system includes at least one processor, and the at least one processor is configured to implement a function in any one of the second aspect or the possible implementations of the second aspect. In a possible embodiment, the chip system may further include a memory. The memory is configured to store program instructions and data for an apparatus for processing three-dimensional data. The chip system may include a chip, or may include a chip and another discrete component.

An eighteenth aspect of this application provides a chip system. The chip system includes at least one processor, and the at least one processor is configured to implement a function in any one of the third aspect or the possible implementations of the third aspect. In a possible embodiment, the chip system may further include a memory. The memory is configured to store program instructions and data for an apparatus for constructing a convolutional neural network. The chip system may include a chip, or may include a chip and another discrete component.

A nineteenth aspect of this application provides a data structure applied to the method for processing three-dimensional data described in the first aspect or the second aspect. At least one first background value of first data is applied to the method for processing three-dimensional data, and the at least one first background value is represented in a form of a one-dimensional array or a multidimensional array.

A twentieth aspect of this application provides a data structure applied to the method for processing three-dimensional data described in the first aspect or the second aspect. A first sparse distribution diagram of first data is applied to the method for processing three-dimensional data, and the first sparse distribution diagram is represented in a form of a multidimensional array.

A twenty-first aspect of this application provides a data structure applied to the method for processing three-dimensional data described in the first aspect or the second aspect. First data is applied to the method for processing three-dimensional data, sparse distribution of the first data in different channel dimensions is the same, and sequence numbers of the channel dimensions in which distribution is the same are represented in a form of a one-dimensional array.

According to the solutions provided in embodiments of this application, before an intermediate result is searched for from a first correspondence, an intermediate result of each first background value and the convolution kernel is calculated, for example, an intermediate result 1 of 101 and the convolution kernel, an intermediate result 2 of 102 and the convolution kernel, and an intermediate result 3 of 103 and the convolution kernel. Because the first background value corresponds to the background identifier, a correspondence between a background identifier and a convolution result may be established, for example, 1→the intermediate result 1, 2→the intermediate result 2, and 3→the intermediate result 3. Generally, the first data includes many first voxels. In a conventional technology, a process of performing convolution processing on the first data is a process of performing calculation on values of the first voxels and the convolution kernel one by one. However, most of the first voxels indicate a background, and values of the first voxels indicating a background have much repetition. A speed of calculation performed on the values of the first voxels and the convolution kernel one by one is very low. However, in this application, for each first background value, calculation is first performed with the convolution kernel to obtain an intermediate result, and then a correspondence between the intermediate result and a background identifier is stored. During convolution processing of the first data, for the first voxel indicating a background in the first data, the intermediate result may be directly found by searching the correspondence, and then the value of the second voxel in the second data may be obtained by using the intermediate result. There is no need to perform a large amount of calculation on a value of each first voxel and the convolution kernel, thereby reducing calculation overheads and implementing convolution acceleration.

DESCRIPTION OF EMBODIMENTS

Figure 1A:
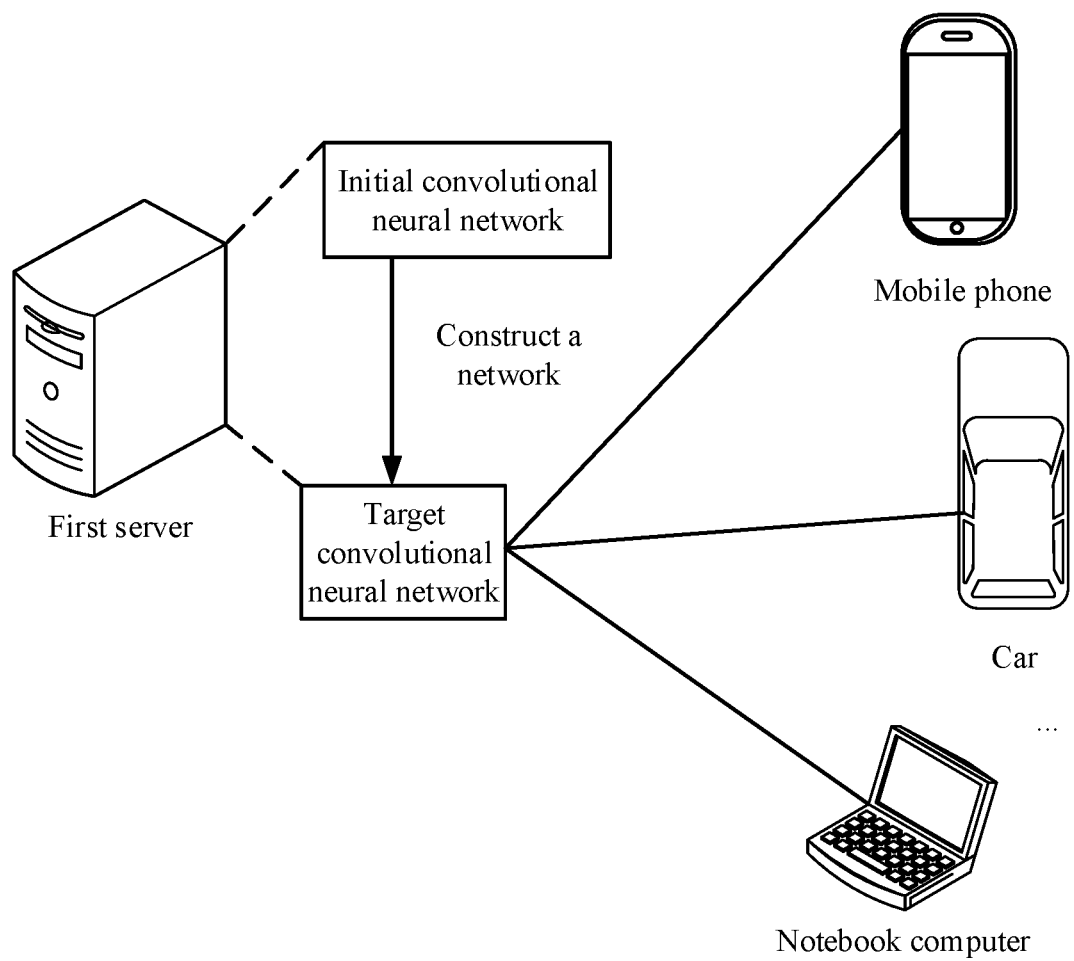
FIG. 1A is a schematic diagram of an embodiment of an artificial intelligence system according to an embodiment of this application.

The following describes embodiments of this application with reference to accompanying drawings. It is clear that the described embodiments are merely some but not all of embodiments of this application. A person of ordinary skill in the art may learn that, with technology development and emergence of a new scenario, technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

Embodiments of this application provide a method for processing three-dimensional data, to improve a computing speed of three-dimensional convolution. Embodiments of this application further provide a corresponding method for constructing a convolutional neural network, a corresponding apparatus, a system, a computer-readable storage medium, a computer program product, and the like. Details are separately described below.

Embodiments of this application relate to construction of a convolutional neural network and processing of three-dimensional data by using the constructed convolutional neural network. For ease of understanding, the following first describes some terms related to this application.

In this application, the convolutional neural network is a three-dimensional convolutional neural network, such as ResNet or ForkNet. The convolutional neural network is a neural network including a plurality of three-dimensional convolution operators, and is used to process three-dimensional data.

The three-dimensional data is data in three dimensions, and the three-dimensional data is usually sparse data. The three-dimensional data may be video data, voice data, or text data.

The sparse data is data with a large quantity of duplicate elements, and the duplicate elements are referred to as a background of the data.

The sparse data is further classified into generalized sparse data and narrow-sense sparse data. The generalized sparse data means that the background of three-dimensional data includes a plurality of background values. The narrow-sense sparse data means that there is only one background value in the background of three-dimensional data. The solutions provided in this application are applicable to both processing of the generalized sparse data and processing of the narrow-sense sparse data.

The background value is a value used to describe a duplicate element background, and may be 0, 1, 2, ..., 101, 102, 103, or any other value. For example, a decimal, a negative number, or a complex number may all be used as a background value. One piece of three-dimensional data may include one or more backgrounds, and a background value may be set for each background. For example, when air is used as a background, a background value of the air background is set to 101; when an object surface is used as a background, a background value of the object surface background is set to 102; and when an area that is not detected by a depth camera is used as a background, a background value of the background of the area that is not detected is set to 102.

Sparse distribution means background distribution of the three-dimensional data. The background distribution may be represented by a background identifier of each voxel. The background identifier may be a value or a character that numbers the background, for example, 1, 2, 3, A, B, or C. The background identifier is associated with a background value. For example, a background identifier 1 is associated with the background value 101, a background identifier 2 is associated with the background value 102, and a background identifier 3 is associated with the background value 103.

The three-dimensional data includes a voxel. The voxel is an abbreviation of a volume element, which indicates a smallest unit of the three-dimensional data in spatial segmentation, and is similar to a pixel in two-dimensional data.

Convolution processing means that a value is multiplied by each position of a convolution kernel of a convolution operator, and then accumulation is performed to obtain a convolution result of the value. The value may be a background value or a non-background value. If only multiplication is performed to obtain a product, and accumulation is not performed, a plurality of intermediate results are obtained, and a quantity of intermediate results corresponds to a size of the convolution kernel.

In a three-dimensional convolution operator, a convolution kernel is usually in a form of a multidimensional array. A size of the convolution kernel is usually preset, for example, 3*3*1*L, where a first 3 represents a width, a second 3 represents a height, 1 represents a depth, and L represents a quantity of channel dimensions. In a process of performing convolution processing on three-dimensional video data, a channel dimension usually represents a color. Certainly, the channel dimension may alternatively have another definition. In a channel dimension, the convolution kernel is like a sliding window of three-dimensional data in the channel dimension.

If the convolution kernel has a plurality of channel dimensions, when an intermediate result of a background value is calculated, for any one of nine positions: 3*3*1 positions, the background value may be multiplied by vectors at a corresponding position in the L channel dimensions, and then products at the position in the L channel dimensions are accumulated, to obtain an intermediate result at the position. If the nine intermediate results are further accumulated, a convolution result is obtained, and the convolution result is usually a vector.

The sliding window of the three-dimensional data means a window that may slide on a plurality of voxels of the three-dimensional data, and the window may cover a plurality of voxels at a time. For example, if a size of the sliding window is 3*3, the sliding window may cover nine voxels by sliding once. This may also be described as a description that the sliding window covers nine voxels.

A solution for constructing a convolutional neural network and a solution for processing three-dimensional data that are included in an artificial intelligence (AI) system provided in embodiments of this application may be implemented in different devices. The solution for constructing a convolutional neural network may be performed offline. After a target convolutional neural network that can be applied is obtained, the target convolutional neural network may be sent to a terminal device or another server in a form of a file, and the terminal device or the another server uses the target convolutional neural network to perform a process for processing three-dimensional data. The following separately provides descriptions with reference to schematic diagrams of architectures of artificial intelligence systems shown in FIG. 1A and FIG. 1B.

As shown in FIG. 1A, a first server obtains an initial convolutional neural network, and then performs a network construction process, to obtain a target convolutional neural network. The initial convolutional neural network may be preconfigured by a developer with reference to a used application scenario. For example, an initial convolutional neural network configured for a self-driving scenario is different from an initial convolutional neural network configured for another scenario, but construction principles are the same. A process from the initial convolutional neural network to the target convolutional neural network is described later.

After constructing the target convolutional neural network, the first server may send the target convolutional neural network to a corresponding terminal device, and the terminal device processes, by using the target convolutional neural network, three-dimensional data to be processed by the terminal device. The three-dimensional data may be directly collected by the terminal device, or may be obtained by the terminal device by collecting two-dimensional data and then extending the two-dimensional data in depth.

Figure 1B:
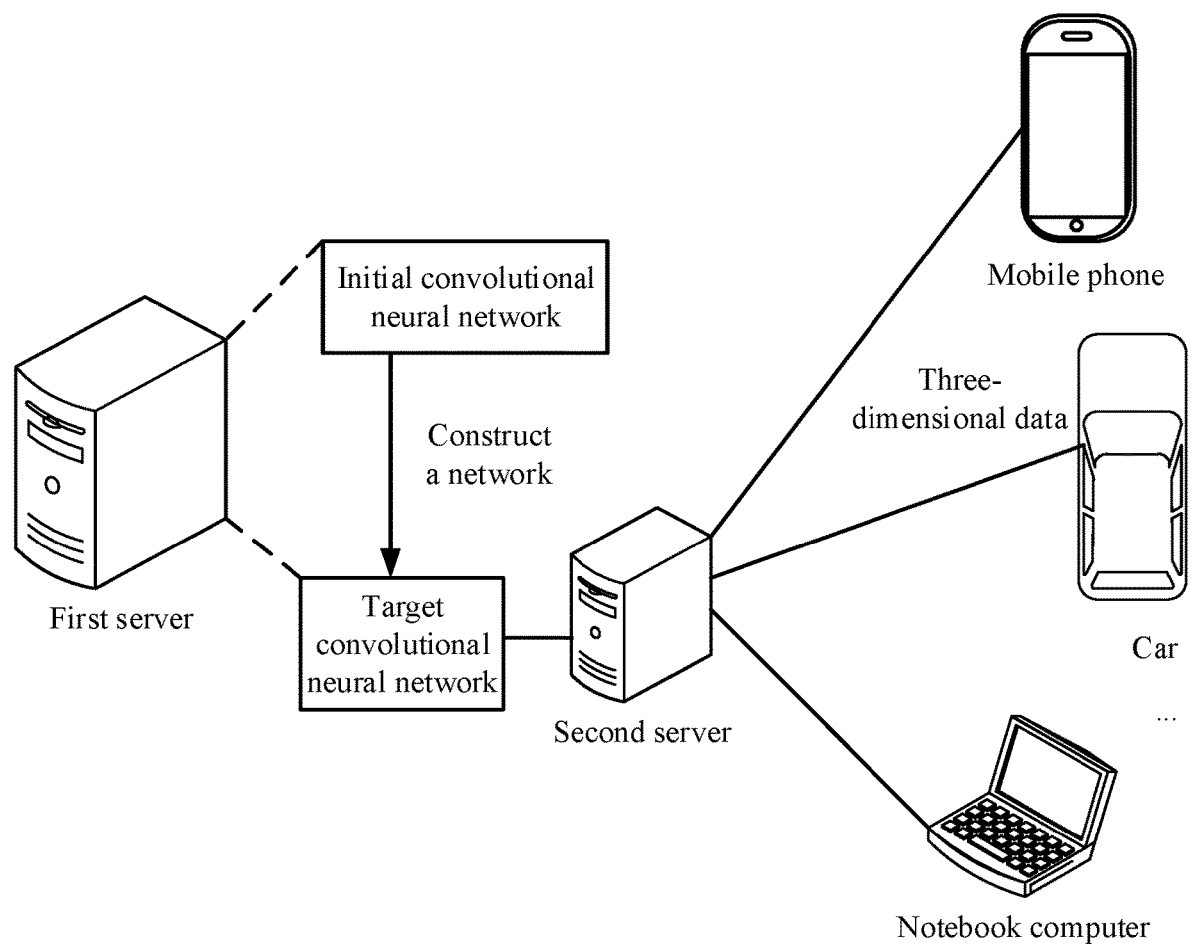
FIG. 1B is a schematic diagram of an embodiment of an artificial intelligence system according to an embodiment of this application.

Alternatively, as shown in FIG. 1B, after constructing the target convolutional neural network, the first server may send the target convolutional neural network to a second server, a terminal device sends to-be-processed three-dimensional data to the second server, and the second server processes the three-dimensional data sent by the terminal device. After processing is completed, the second server returns a processing result to the terminal device.

The solution for processing three-dimensional data provided in embodiments of this application may be applied to a plurality of fields in which artificial intelligence (AI) is applied, for example, intelligent manufacturing, intelligent transportation, smart household, smart healthcare, intelligent security protection, self-driving, a safe city, and an intelligent terminal.

Both the first server and the second server may be physical machines, or may be virtual machines (VM) or containers. A VM or a container may be a virtualized device obtained by dividing a hardware resource of a physical machine in a virtualization manner.

The terminal device (which may also be referred to as user equipment (UE)) is a device having a wireless transceiver function, and may be deployed on land, including an indoor or outdoor device, a handheld device, or a vehicle-mounted device, may be deployed on water (for example, on a ship), or may be deployed in the air (for example, on an airplane, a balloon, and a satellite). The terminal device may be a mobile phone, a tablet, a computer having a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, and the like.

Figure 2:
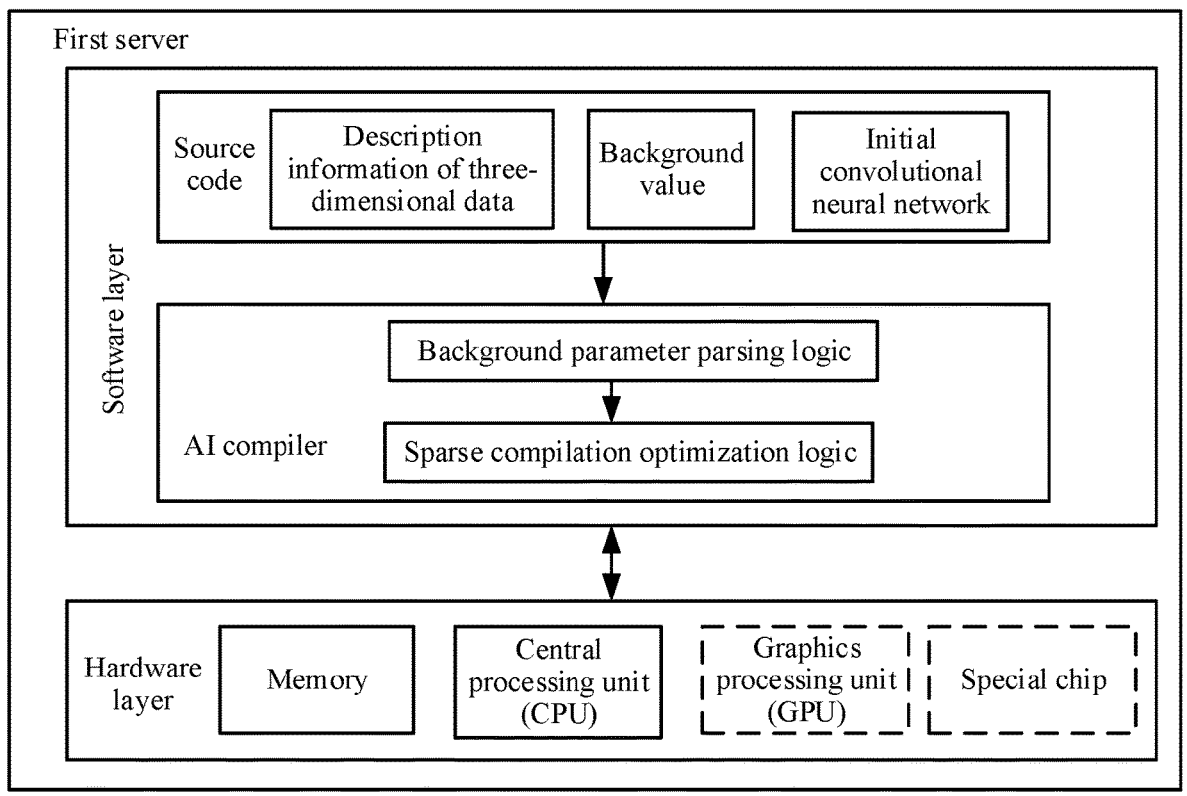
FIG. 2 is a schematic diagram of a structure of a server according to an embodiment of this application.

In this application, as shown in FIG. 2, the first server may include a hardware layer and a software layer. The hardware layer may include a memory and one or more processors. The processors may include a central processing unit (CPU), a graphics processing unit (GPU), or a special chip. The special chip is a chip specially used to construct a network. The special chip may be an application-specific integrated circuit (ASIC), a field-programmable gate array (FPGA), or the like.

The software layer may include source code and an AI compiler. The source code includes an initial convolutional neural network and description information of three-dimensional data in a scenario to which a target convolutional neural network constructed by using the initial convolutional neural network is applied, for example, a definition of a size, a type, or the like of three-dimensional image data or video data that is input into the target convolutional neural network in a self-driving scenario. The source code further includes a background value included in the three-dimensional data that is input into the target convolutional neural network, for example, three background values 101, 102, and 103.

The AI compiler includes background parameter parsing logic and sparse compilation optimization logic. The AI compiler executes the background parameter parsing logic and the sparse compilation optimization logic based on content in the source code, to obtain the target convolutional neural network.

FIG. 2 describes a structure of the first server used to construct a convolutional neural network. With reference to an accompanying drawing, the following describes a method for constructing a convolutional neural network according to an embodiment of this application.

Figure 3:
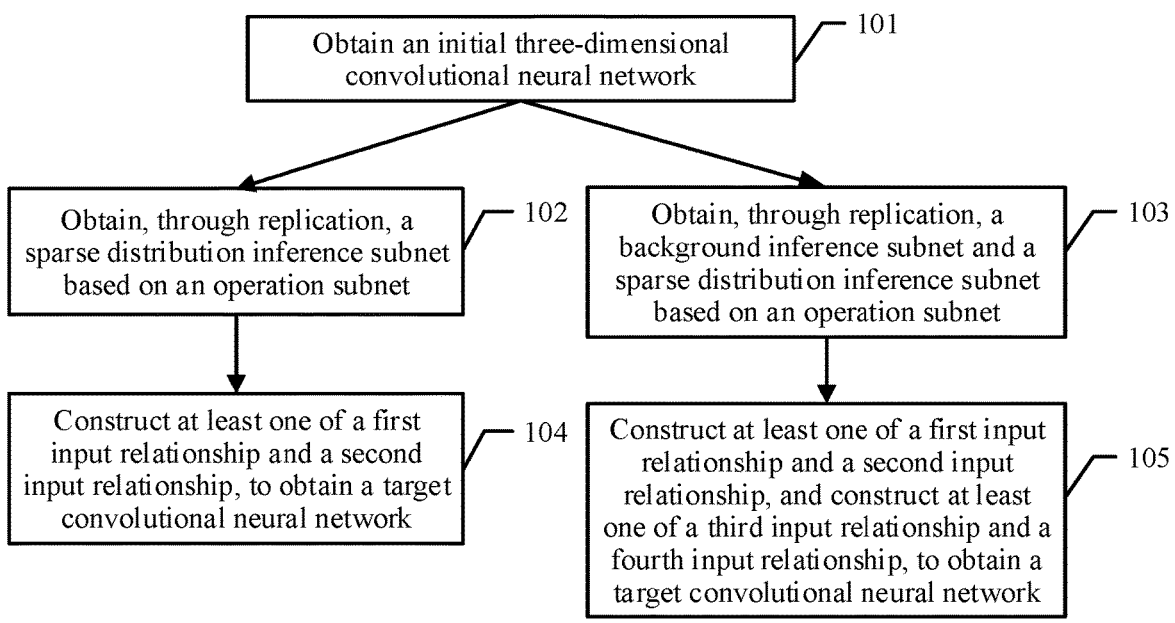
FIG. 3 is a schematic diagram of an embodiment of a method for constructing a convolutional neural network according to an embodiment of this application.

FIG. 3 is a schematic diagram of an embodiment of a method for constructing a convolutional neural network according to an embodiment of this application.

As shown in FIG. 3, an embodiment of a method for constructing a convolutional neural network according to an embodiment of this application includes the following operations.

101. Obtain an initial convolutional neural network.

The initial convolutional neural network includes an operation subnet, and the operation subnet includes at least one first convolution operator.

The operation subnet may be the entire initial convolutional neural network, or may be a part of the initial convolutional neural network.

The first convolution operator is a three-dimensional convolution operator, and these three-dimensional convolution operators and other operators are arranged based on a network structure, so that three-dimensional data may be processed.

After operation 101 is performed, operation 102 may be performed, or operation 103 may be performed.

102. Obtain, through replication, a sparse distribution inference subnet based on the operation subnet.

A network structure of the sparse distribution inference subnet is the same as a network structure of the operation subnet. The sparse distribution inference subnet is used to infer a sparse distribution diagram of three-dimensional data.

Operation 104 is performed after operation 102.

103. Obtain, through replication, a background inference subnet and a sparse distribution inference subnet based on the operation subnet.

Network structures of both the background inference subnet and the sparse distribution inference subnet are the same as a network structure of the operation subnet. The background inference subnet is used to infer a background value of three-dimensional data. The sparse distribution inference subnet is used to infer a sparse distribution diagram of three-dimensional data.

Operation 105 is performed after operation 103.

104. Construct at least one of a first input relationship and a second input relationship, to obtain a target convolutional neural network.

The first input relationship is an input relationship from a second convolution operator in the sparse distribution inference subnet to a first convolution operator at a corresponding position, and the second input relationship is an input relationship from an operator that is in the sparse distribution inference subnet and that inputs data into the second convolution operator to the first convolution operator at the corresponding position, to obtain the target convolutional neural network.

105. Construct at least one of a first input relationship and a second input relationship, and construct at least one of a third input relationship and a fourth input relationship, to obtain a target convolutional neural network.

The first input relationship is an input relationship from a second convolution operator in the sparse distribution inference subnet to a first convolution operator at a corresponding position, and the second input relationship is an input relationship from an operator that is in the sparse distribution inference subnet and that inputs data into the second convolution operator to the first convolution operator at the corresponding position.

The at least one of the third input relationship and the fourth input relationship is constructed. The third input relationship is an input relationship from a third convolution operator in the background inference subnet to a first convolution operator at a corresponding position, the fourth input relationship is an input relationship from an operator that is in the background inference subnet and that inputs data into the third convolution operator to the first convolution operator at the corresponding position, the first input relationship corresponds to the third input relationship, and the second input relationship corresponds to the fourth input relationship.

In this application, a three-dimensional convolution operator in the operation subnet is referred to as a first convolution operator, a three-dimensional convolution operator in the sparse distribution inference subnet is referred to as a second convolution operator, and a three-dimensional convolution operator in the background inference subnet is referred to as a third convolution operator.

The target convolutional neural network obtained by combining operations 101, 102, and 104 includes the operation subnet and the sparse distribution inference subnet, but does not include a background inference subnet. In this case, the first server also may obtain, through replication, a background inference subnet based on the operation subnet. Then, a background value of three-dimensional data is input into the background inference subnet for running, to obtain a first background value and a second background value that are required by the first convolution operator in the operation subnet. Then, the background inference subnet is connected to the operation subnet in a form of a data file.

The target convolutional neural network obtained by combining operations 101, 103, and 105 includes the operation subnet, the sparse distribution inference subnet, and the background inference subnet.

According to the solution provided in this embodiment of this application, based on the initial convolutional neural network used to process only three-dimensional data, the background inference subnet and the sparse distribution inference subnet with the same structure are added for the operation subnet. In this way, it may be ensured that in a process in which convolution operators at different positions in the operation subnet perform convolution processing on the three-dimensional data, a background value at a corresponding position may be obtained from the background inference subnet, and a sparse distribution diagram at a corresponding position may be obtained from the sparse distribution inference subnet. Therefore, it may be ensured that the target convolutional neural network constructed in this application may improve a convolution processing speed.

In some embodiments, after operation 102 in the embodiment described in FIG. 3, the method further includes: determining the operation subnet from the initial convolutional neural network, where input data of all operators in the operation subnet has same sparse distribution in a channel dimension, output data of all the operators has same sparse distribution in the channel dimension, and the channel dimension represents a dimension different from three-dimensional space.

After the operation subnet is determined, replication may be directly performed based on the determined operation subnet; or the operation subnet may be cut from the initial convolutional neural network, and then replication is performed. After the sparse distribution inference subnet and the background inference subnet are obtained through replication, and the input relationship in operation 104 or 105 between operators in the three subnets is established, a remaining network other than the operation subnet in the initial convolutional neural network may be spliced to a position of the operation subnet that is before separation.

In this embodiment of this application, after the initial convolutional neural network is obtained, the initial convolutional neural network may be detected, and the operation subnet is detected from the initial convolutional neural network. A process of detecting the operation subnet may be: Starting from a first operator of the initial convolutional neural network, each operator in the convolutional neural network is detected one by one; if continuously detected operators are operators in a whitelist, and a convolution operator is also in the whitelist, the detection may continue to be performed; and if it is detected that an operator is not an operator in the whitelist, the detection is terminated, and a segment of subnet from the first operator to a last convolution operator before the operator on which the detection is terminated is determined, or may be cut out to form the operation subnet. The whitelist is preconfigured. When input data of each operator in the whitelist has same sparse distribution in all channel dimensions, it may be ensured that output data of the operator has same sparse distribution in all channel dimensions. The channel dimension may be a color dimension, or may be a dimension representing another feature. Same sparse distribution may also be referred to as "same distribution".

Figure 4A:
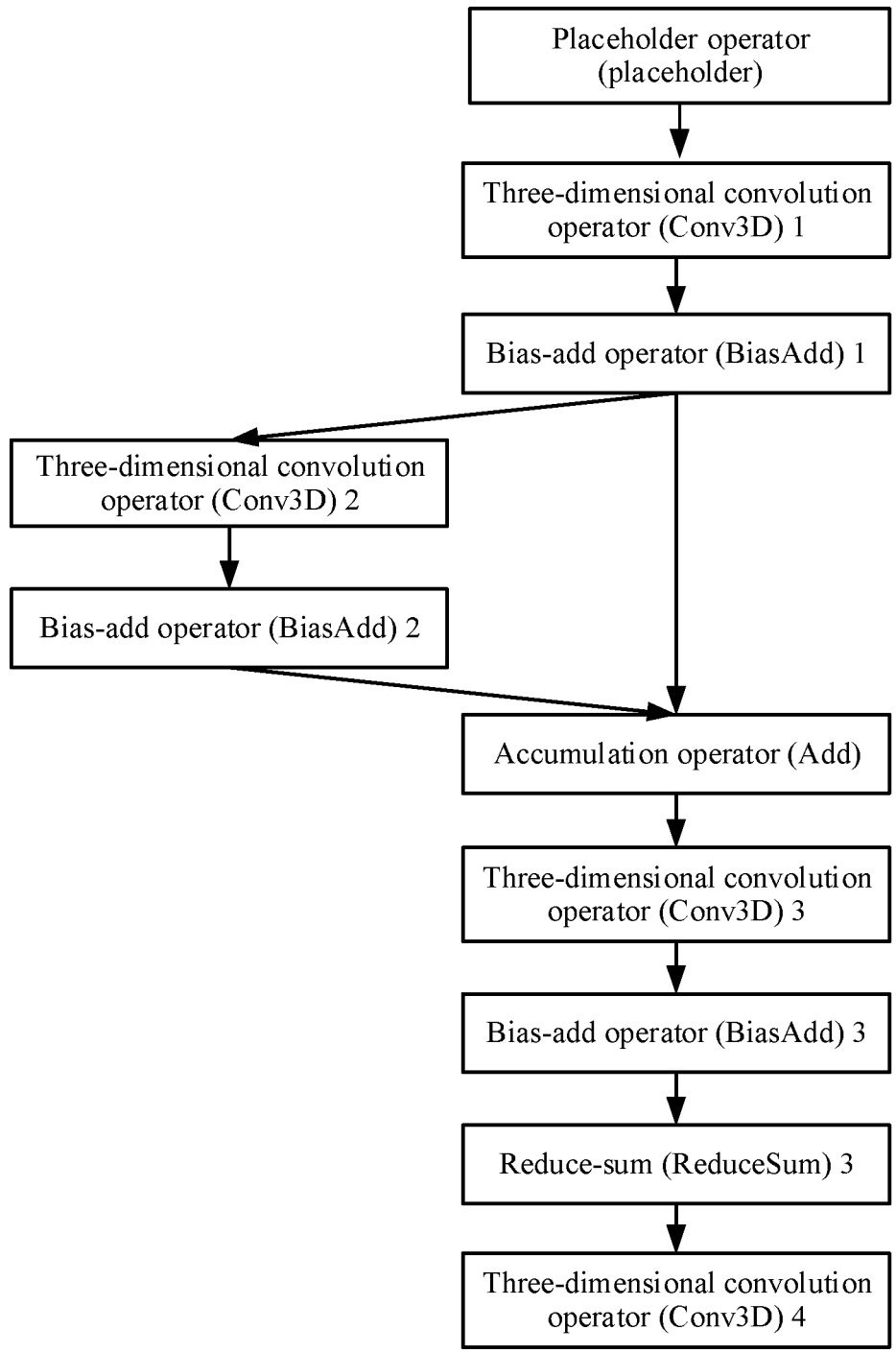
FIG. 4A to FIG. 4G are schematic diagrams of scenario examples of different phases in a process of constructing a convolutional neural network according to an embodiment of this application.
Figure 4B:
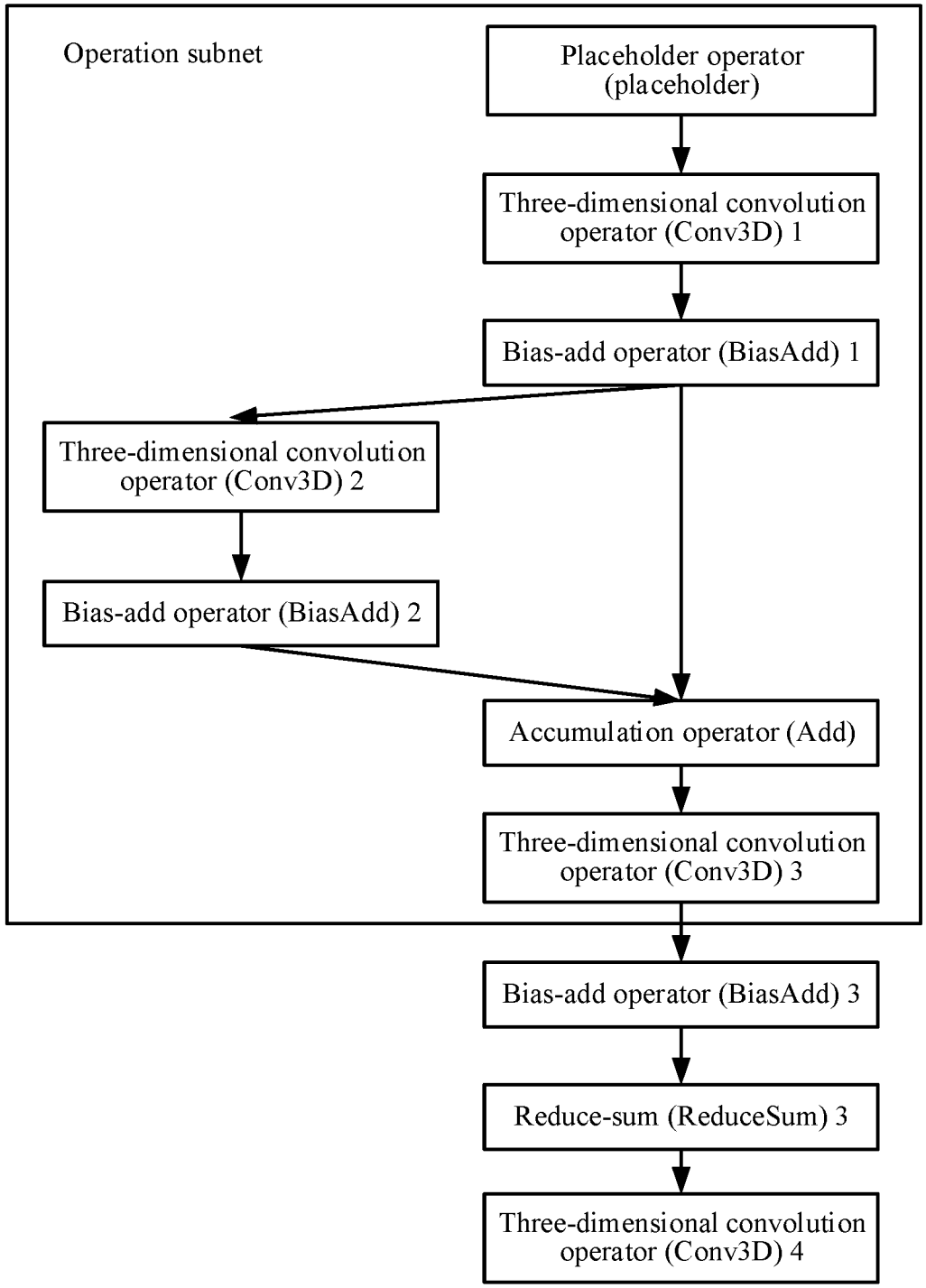

For understanding of the process of cutting the operation subnet, refer to scenario examples in FIG. 4A and FIG. 4B. As shown in FIG. 4A, the initial convolutional neural network includes a placeholder operator (placeholder), a three-dimensional convolution operator (Conv3D) 1, a bias-add operator (BiasAdd) 1, a three-dimensional convolution operator 2, a bias-add operator 2, an accumulation operator (Add), a three-dimensional convolution operator 3, a bias-add operator 3, a reduce-sum operator (Reduce Sum), and a three-dimensional convolution operator 4. Operator-by-operator detection starts from the placeholder operator. If it is detected that the operator is a three-dimensional convolution operator or an operator in the whitelist, a next operator continues to be detected. In the scenario shown in FIG. 4A, when the reduce-sum operator is detected, it is determined that the reduce-sum operator is not in the whitelist, and therefore the detection is terminated. Then, related convolution operators starting from the placeholder operator to the three-dimensional convolution operator 3 are classified as an operation subnet shown in FIG. 4B, and then the operation subnet may be cut from the initial convolutional neural network. In this scenario, the reduce-sum operator cannot maintain same sparse distribution of output data in different channel dimensions.

Figure 4C:
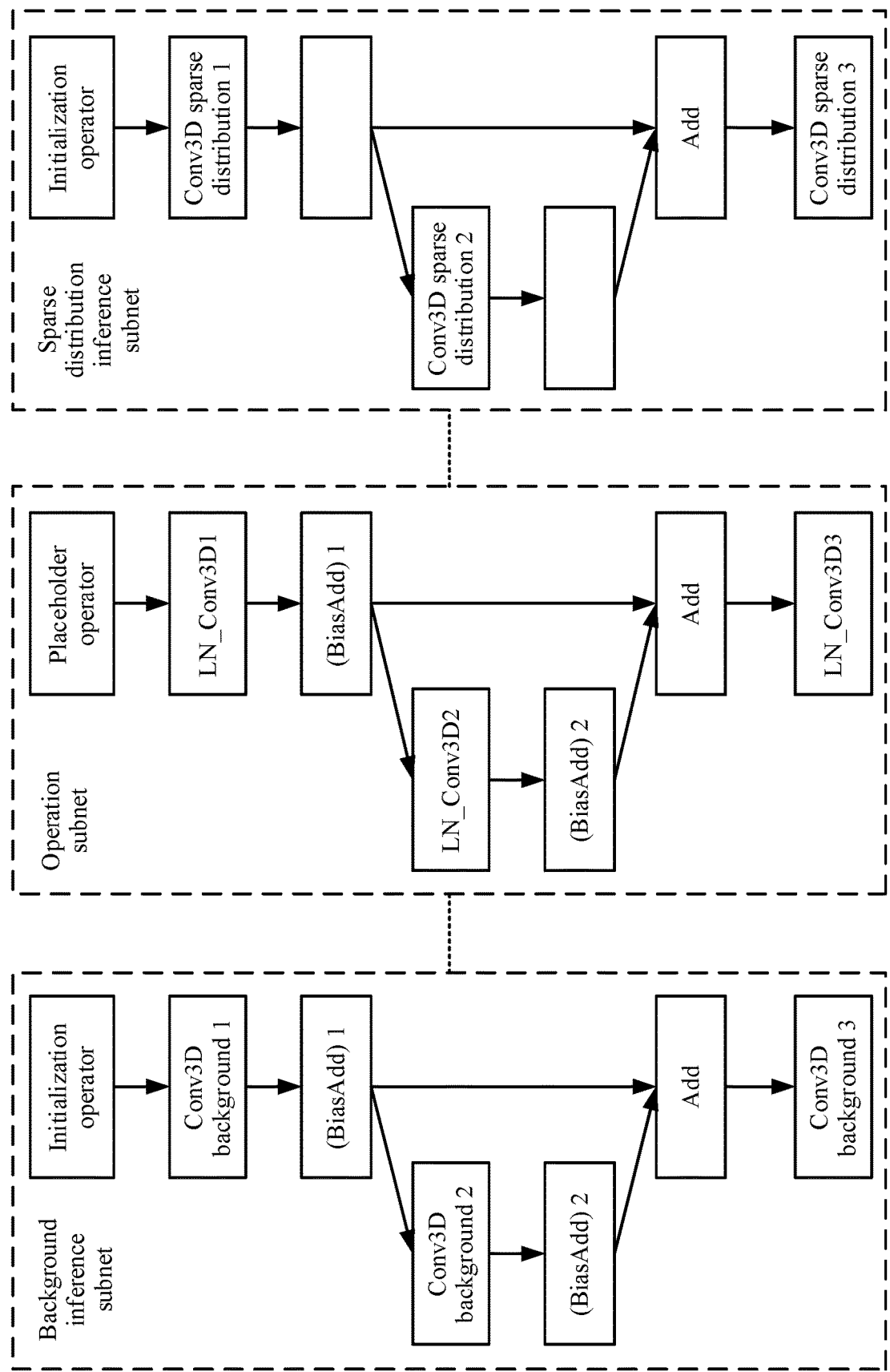

After the operation subnet is cut from the initial convolutional neural network, the background inference subnet and the sparse distribution inference subnet are obtained through replication based on the operation subnet. After the background inference subnet and the sparse distribution inference subnet are obtained through replication, names of operators in the background inference subnet and the sparse distribution inference subnet may be adjusted. As shown in FIG. 4C, a first operator in the background inference subnet and a first operator in the sparse distribution inference subnet are both adjusted to an initialization operator, a three-dimensional convolution operator in the operation subnet is described as "LN_Conv3D", a three-dimensional convolution operator in the background inference subnet is described as a "Conv3D background", and a three-dimensional convolution operator in the sparse distribution inference subnet is described as "Conv3D sparse distribution". In addition, because a bias-add operator (BiasAdd) in the sparse distribution inference subnet does not affect sparse distribution, the bias-add operator may be adjusted to an empty operator, so that computation may be reduced in a process for processing three-dimensional data.

Then, an input relationship between an operator that corresponds to the at least one first convolution operator and that is in either of the background inference subnet and the sparse distribution inference subnet and the corresponding first convolution operator is separately established. That is, the first input relationship, the second input relationship, the third input relationship, and the fourth input relationship in operations 104 and 105 are established.

Figure 4D:
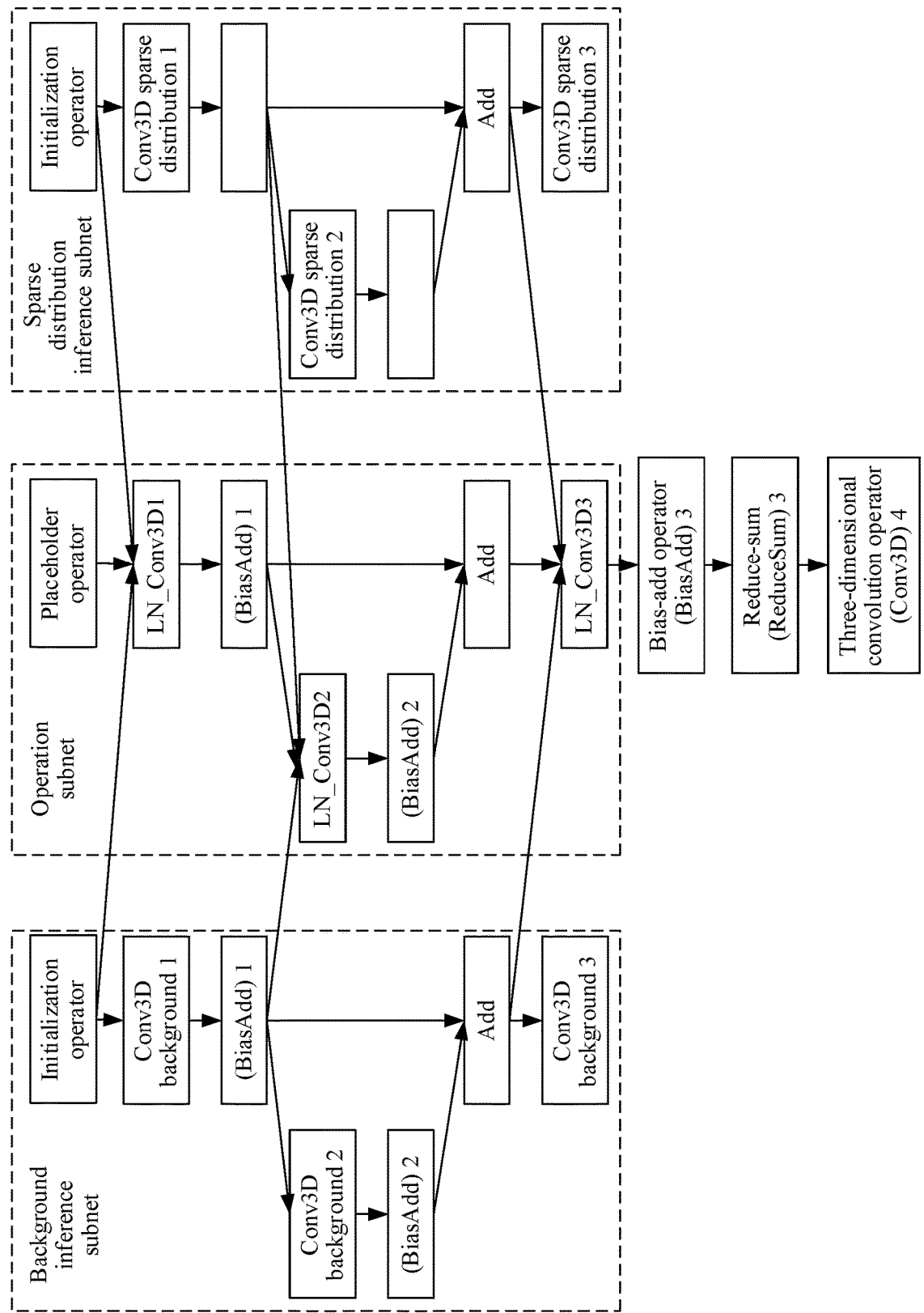

As shown in FIG. 4D, an input relationship, that is, a fourth input relationship, between an operator that is in the background inference subnet and that inputs data into a "Conv3D background" and "LN_Conv3D" that corresponds to the "Conv3D background" may be established. A connection, that is, a second input relationship, between an operator that is in the sparse distribution inference subnet and that inputs data into "Conv3D sparse distribution" and "LN_Conv3D" that corresponds to the "Conv3D sparse distribution" is established. As shown in FIG. 4D, an input relationship is established between the initialization operator in the background inference subnet and "LN_Conv3D1", and an input relationship is established between the initialization operator in the sparse distribution inference subnet and "LN_Conv3D1". Similarly, an input relationship is established between BaisAdd1 in the background inference subnet and "LN_Conv3D2", and an input relationship is established between a first empty operator in the sparse distribution inference subnet and "LN_Conv3D2". An input relationship is established between Add in the background inference subnet and "LN_Conv3D3", and an input relationship is established between Add in the sparse distribution inference subnet and "LN_Conv3D3", to obtain a target convolutional neural network shown in FIG. 4D.

Figure 4E:
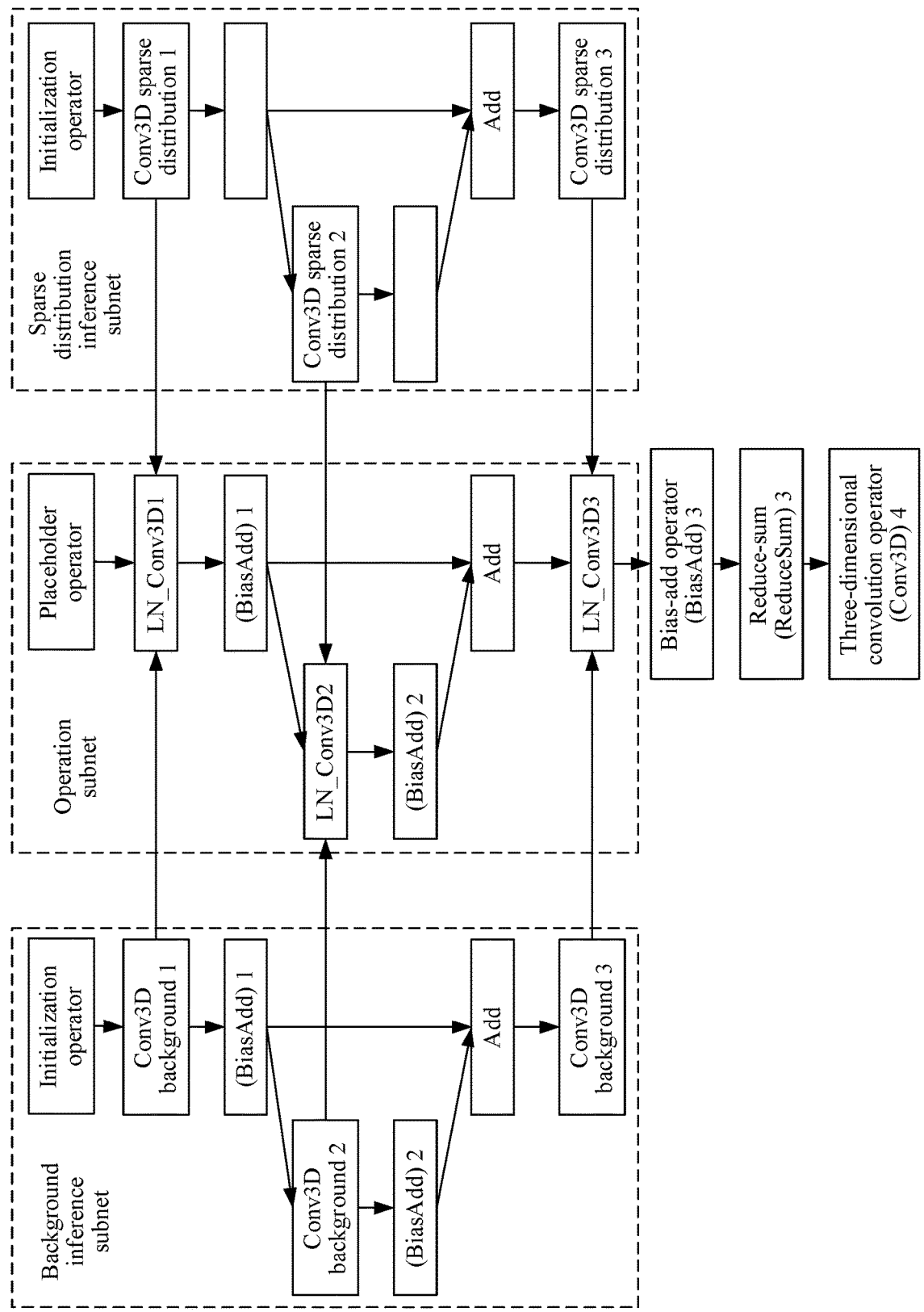

Alternatively, as shown in FIG. 4E, connections, that is, a third input relationship and a first input relationship, between either of a "Conv3D background" and "Conv3D sparse distribution" and corresponding "LN_Conv3D" are established. As shown in FIG. 4E, an input relationship is established between a "Conv3D background 1" in the background inference subnet and "LN_Conv3D1", and an input relationship is established between "Conv3D sparse distribution 1" in the sparse distribution inference subnet and "LN_Conv3D1". Similarly, an input relationship is established between a "Conv3D background 2" in the background inference subnet and "LN_Conv3D2", and an input relationship is established between "Conv3D sparse distribution 2" in the sparse distribution inference subnet and "LN_Conv3D2". An input relationship is established between a "Conv3D background 3" in the background inference subnet and "LN_Conv3D3", and an input relationship is established between "Conv3D sparse distribution 3" in the sparse distribution inference subnet and "LN_Conv3D3", to obtain a target convolutional neural network shown in FIG. 4E.

Figure 4F:
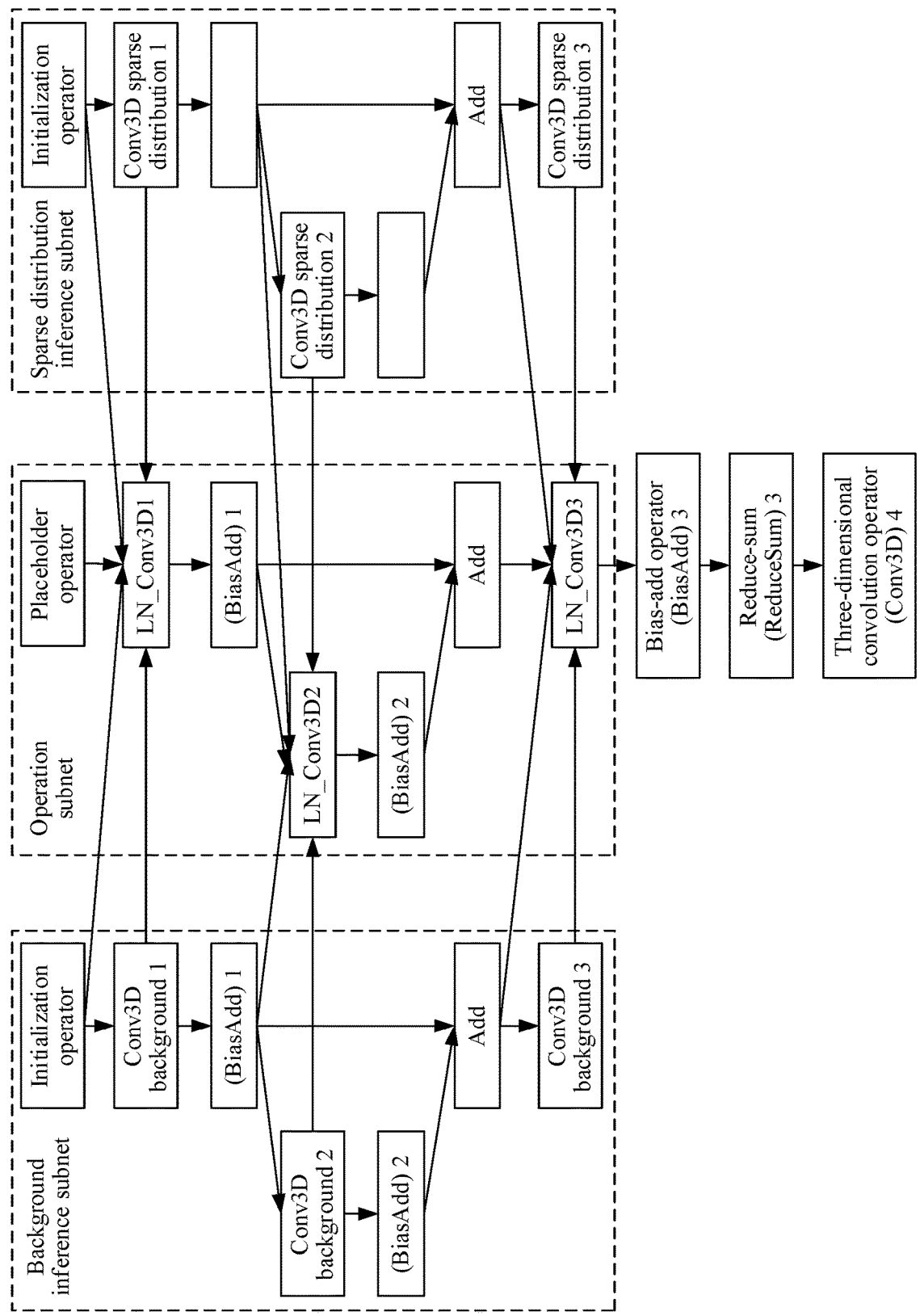

In this application, a second input relationship and a fourth input relationship may be further established based on FIG. 4E, to obtain a target convolutional neural network shown in FIG. 4F.

In addition, FIG. 4A to FIG. 4F describe scenarios in which a target convolutional neural network includes three subnets. For example, the target convolutional neural network obtained by performing operations 101, 102, and 104 does not include a background inference subnet. In this way, corresponding to FIG. 4D, FIG. 4E, and FIG. 4F, the background inference subnet is removed, but at least one of the third input relationship and the fourth input relationship is retained, so that schematic scenario diagrams of three corresponding target convolutional neural networks that include only the operation subnet and the sparse distribution inference subnet may be obtained. The following uses a scenario corresponding to FIG. 4F as an example, to obtain a target convolutional neural network shown in FIG. 4G. Background values to be input in the third input relationship and the fourth input relationship may be input into corresponding "LN_Conv3D" in a form of a file. The background values to be input in the third input relationship and the fourth input relationship may be stored in a memory or stored in different registers. Background values corresponding to different "LN_Conv3D" may be read from the memory or the different registers.

After the target convolutional neural network is constructed, the target convolutional neural network may be converted into a binary code file applicable to a terminal device or a second server, and then the binary code file is sent to a corresponding terminal device or second server; or the binary code file is sent after a loading request is sent by a corresponding terminal device or second server. Alternatively, the target convolutional neural network may be directly sent without performing binary code conversion.

The foregoing embodiment describes the method for constructing a convolutional neural network according to an embodiment of this application. With reference to an accompanying drawing, the following describes a method for processing three-dimensional data according to an embodiment of this application.

The method for processing three-dimensional data according to this embodiment of this application may be implemented by using three solutions: 1. Inputting first data, at least one first background value, and a first sparse distribution diagram into a target convolution operator of a convolutional neural network. 2. Inputting first data, at least one second background value, and a second sparse distribution diagram into a target convolution operator of a convolutional neural network. 3. Inputting first data, at least one first background value, at least one second background value, a first sparse distribution diagram, and a second sparse distribution diagram into a target convolution operator of a convolutional neural network. Regardless of which solution is used, the target convolution operator may output second data, and only a speed is slightly different. The following separately describes the solutions.

In addition, it should be noted that a "convolutional neural network" is used in the embodiment of the method for processing three-dimensional data, and the "convolutional neural network" is the target convolutional neural network constructed in the foregoing embodiment.

1. Inputting first data, at least one first background value, and a first sparse distribution diagram into a target convolution operator of a convolutional neural network.

Figure 5:
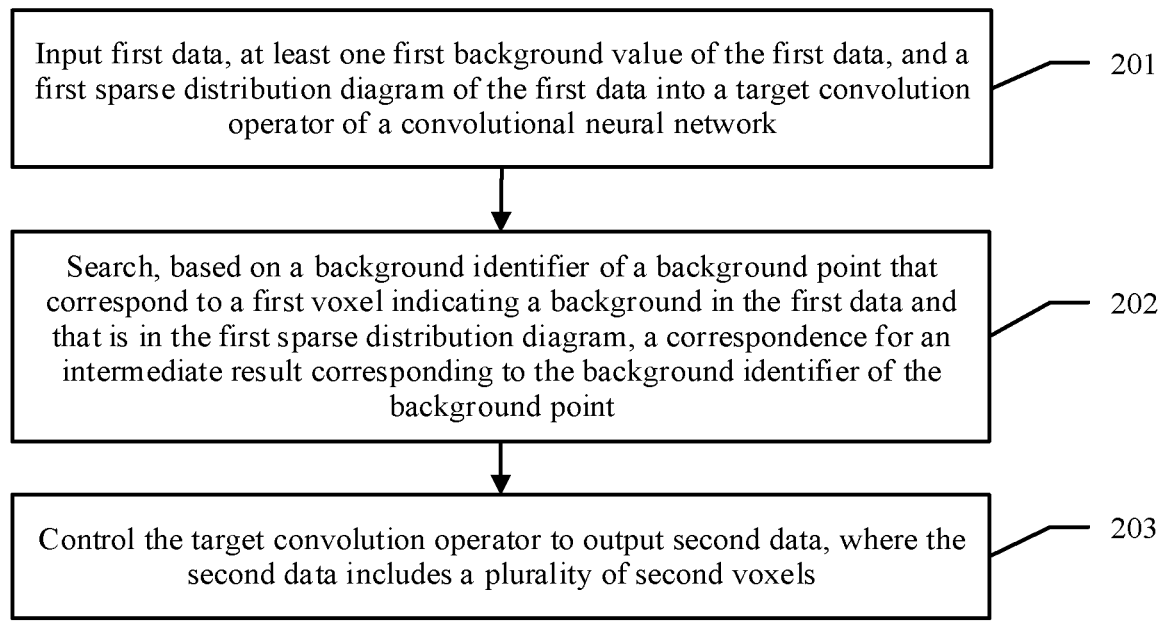
FIG. 5 is a schematic diagram of an embodiment of a method for processing three-dimensional data according to an embodiment of this application.

As shown in FIG. 5, an embodiment of a method for processing three-dimensional data according to an embodiment of this application includes the following operations.

201. Input first data, at least one first background value of the first data, and a first sparse distribution diagram of the first data into a target convolution operator of a convolutional neural network.

The convolutional neural network includes at least one first convolution operator, and the target convolution operator is any one of the at least one first convolution operator.

The first data includes a plurality of first voxels, the at least one first background value indicates at least one background in the first data, and the at least one first background value is in a one-to-one correspondence with the at least one background. The first sparse distribution diagram describes sparse distribution of the plurality of first voxels by using a background identifier and a non-background identifier, the background identifier indicates that a first voxel that corresponds to the background identifier and that is in the first data is a background, and the non-background identifier indicates that a first voxel that corresponds to the non-background identifier and that is in the first data is a non-background.

In this application, the first data is a multidimensional array (tensor) of video data, voice data, or text data.

There is at least one first background value, that is, one or more first background values. "A plurality of" in this application includes two or more, or may be described as at least two. The first background value indicates a value of the background in the first data, for example, 0, 1, 2, 101, 102, or 103, and is not limited to a positive number, a negative number, a decimal, or a complex number. The first background value may be randomly selected. This is not limited in this application.

A voxel in the first data is referred to as a first voxel. Each first voxel has a value, and the value of the first voxel may be a vector. If a value of a first voxel indicates a background, it indicates that the first voxel is a voxel indicating a background. If a value of a first voxel indicates a non-background, it indicates that the first voxel is a voxel indicating a non-background. Many background values of the first data are repeated. For example, the first data includes 1000 first voxels, and 950 of the 1000 first voxels are voxels indicating a background. The 950 first voxels may have only three background values, for example, 101, 102, and 103. Certainly, the three background values 101, 102, and 103 are merely examples, and the first data may alternatively relate to more background values or fewer background values. In this application, the first background value of the first data is 101, 102, and 103 in the example, indicating that there are three backgrounds, and each background corresponds to one background value.

A structure of the first sparse distribution diagram corresponds to a structure of the first data. In an example shown in FIG. 6, if the structure of the first data is a 5*5*1 structure, the first sparse distribution diagram is a 5*5 sparse distribution diagram. A unit in the first data is a first voxel, and a unit in the first sparse distribution diagram may be referred to as a "point". A point corresponding to a first voxel indicating a background may be referred to as a "background point", a point corresponding to a first voxel indicating a non-background may be referred to as a "non-background point", and the non-background point may also be referred to as a "dense point". The background point is marked with a background identifier, for example, 1, 2, or 3. The non-background point is marked with a unified non-background identifier.

The background identifier corresponds to the first background value. For example, in the example shown in FIG. 6, there are three first background values 101, 102, and 103, and background identifiers 1, 2, and 3. A correspondence may be in the following manner: 101→1, 102→2, and 103→3. Correspondences between the first background values and the background identifiers are usually implicit correspondences based on their respective orders, or may be displayed in a form of a table or a mapping relationship. The non-background identifier may be uniformly represented by M, where M is an abbreviation of Max, and represents a non-background point.

202. Search, based on a background identifier of a background point that corresponds to a first voxel indicating a background in the first data and that is in the first sparse distribution diagram, a correspondence for an intermediate result corresponding to the background identifier of the background point.

The correspondence indicates a relationship between an intermediate result of each of the at least one first background value and a background identifier corresponding to each of the at least one first background value, an intermediate result of one first background value in the at least one first background value is obtained through calculation by using the first background value and a convolution kernel of the target convolution operator, and the intermediate result corresponding to the background identifier of the background point is used to determine a value of a second voxel in second data.

Before the correspondence is used to search for the intermediate result, the correspondence is usually first established and stored. For a meaning of the convolution kernel, refer to the foregoing description for understanding.

203. Control the target convolution operator to output the second data, where the second data includes a plurality of second voxels.

According to the solution provided in this embodiment of this application, before an intermediate result is searched for from a first correspondence, an intermediate result of each first background value and the convolution kernel is calculated, for example, an intermediate result 1 of 101 and the convolution kernel, an intermediate result 2 of 102 and the convolution kernel, and an intermediate result 3 of 103 and the convolution kernel. Because the first background value corresponds to the background identifier, a correspondence between a background identifier and a convolution result may be established, for example, 1→the intermediate result 1, 2→the intermediate result 2, and 3→the intermediate result 3. Generally, the first data includes many first voxels. In a conventional technology, a process of performing convolution processing on the first data is a process of performing calculation on values of the first voxels and the convolution kernel one by one. However, most of the first voxels indicate a background, and values of the first voxels indicating a background have much repetition. A speed of calculation performed on the values of the first voxels and the convolution kernel one by one is very low. However, in this application, for each first background value, calculation is first performed with the convolution kernel to obtain an intermediate result, and then a correspondence between the intermediate result and a background identifier is stored. During convolution processing of the first data, for the first voxel indicating a background in the first data, the intermediate result may be directly found by searching the correspondence, and then the value of the second voxel in the second data may be obtained by using the intermediate result. There is no need to perform a large amount of calculation on a value of each first voxel and the convolution kernel, thereby reducing calculation overheads and implementing convolution acceleration.

In some embodiments, intermediate results in the correspondence are results obtained through calculation on the first background value at different positions of the convolution kernel. In this way, operation 202 includes: for each first voxel that indicates a background and that is in a sliding window of the first data, searching, based on a background identifier that corresponds to each first voxel indicating a background and that is in the first sparse distribution diagram and a position that is of each first voxel indicating a background and that is in the sliding window, the correspondence for an intermediate result corresponding to the background identifier at a corresponding position, where a size of the sliding window of the first data is the same as a size of the convolution kernel of the target convolution operator.

In this embodiment of this application, after the at least one first background value is input into the target convolution operator, calculation may be performed by using each first background value and the convolution kernel. A 3*3*1*4 convolution kernel is used as an example, and it indicates that the convolution kernel has four channel dimensions, and has nine positions in one channel dimension. The positions may be shared in other channel dimensions. Vectors at the nine positions in a first channel dimension are represented in a manner shown in Table 1 below:

TABLE 1

| Vectors at the nine positions in the first channel dimension of the convolution kernel | | |
|---|---|---|
| A1 | B1 | C1 |
| D1 | E1 | F1 |
| G1 | H1 | I1 |

If the first background value is 101, a form shown in Table 2 may be obtained by multiplying the first background value by the vectors at the nine positions in the first channel dimension.

TABLE 2

| Vectors at the nine positions in the first channel dimension of the convolution kernel | | |
|---|---|---|
| 101A1 | 101B1 | 101C1 |
| 101D1 | 101E1 | 101F1 |
| 101G1 | 101H1 | 101I1 |

If vectors at the nine positions in a second channel dimension are represented by A2, B2, C2, D2, E2, F2, G2, H2, and I2, 101A2, 101B2, 101C2, 101D2, 101E2, 101F2, 101G2, 101H2, and 101I2 may be obtained by multiplying the first background value 101 by the vectors at the nine positions.

Similarly, if vectors at the nine positions in a third channel dimension are represented by A3, B3, C3, D3, E3, F3, G3, H3, and I3, 101A3, 101B3, 101C3, 101D3, 101E3, 101F3, 101G3, 101H3, and 101I3 may be obtained by multiplying the first background value 101 by the vectors at the nine positions.

If vectors at the nine positions in a fourth channel dimension are represented by A4, B4, C4, D4, E4, F4, G4, H4, and I4, 101A4, 101B4, 101C4, 101D4, 101E4, 101F4, 101G4, 101H4, and 101I4 may be obtained by multiplying the first background value 101 by the vectors at the nine positions.

A1, A2, A3, and A4 belong to vectors at a same position in different dimensions. In this case, an intermediate result at the position of A1 is 101A1+101A2+101A3+101A4. Similarly, as shown in Table 3 below, intermediate results of the first background value 101 at different positions may be obtained by accumulating products of the first background value and vectors at another position.

TABLE 3

| Intermediate results obtained through calculation by using the first background value 101 and different positions of the convolution kernel | | |
|---|---|---|
| 101A1 + 101A2 + 101A3 + 101A4 | 101B1 + 101B2 + 101B3 + 101B4 | 101C1 + 101C2 + 101C3 + 101C4 |
| 101D1 + 101D2 + 101D3 + 101D4 | 101E1 + 101E2 + 101E3 + 101E4 | 101F1 + 101F2 + 101F3 + 101F4 |
| 101G1 + 101G2 + 101G3 + 101G4 | 101H1 + 101H2 + 101H3 + 101H4 | 101I1 + 101I2 + 101I3 + 101I4 |

Similarly, for a first background value that is 102, 103, or another value, intermediate results corresponding to the value at different positions of the convolution kernel may be obtained in the foregoing manner.

If a background identifier corresponding to the first background value 101 is represented by "1", a correspondence is a correspondence between "1" and Table 3.

In a process of obtaining the value of the second voxel from the first data by using the sliding window, the size of the sliding window of the first data is the same as the size of the convolution kernel, the sliding window is usually two-dimensional or three-dimensional, and the convolution kernel is 3*3*1*4. Therefore, the sliding window may be represented as 3*3, or may be represented as 3*3*1. The sliding window of the first data covers nine first voxels by sliding once. If the nine first voxels in the sliding window are all background values, as shown in Table 4:

TABLE 4

| First background values of the nine first voxels in the sliding window of the first data | | |
|---|---|---|
| 101 | 102 | 103 |
| 101 | 102 | 102 |
| 101 | 101 | 101 |

Herein, 101 appears at five positions: a first row and a first column, a second row and the first column, a third row and the first column, the third row and a second column, and the third row and a third column. Therefore, intermediate results at the positions may be obtained from the correspondence between 1 and Table 3, and are respectively 101A1+101A2+101A3+101A4, 101D1+101D2+101D3+101D4, 101G1+101G2+101G3+101G4, 101H1+101H2+101H3+101H4, and 101I1+101I2+101I3+101I4. Similarly, three intermediate results may be obtained from a correspondence between 2 and a table of intermediate results of the first background value 102, and are respectively 102B1+102B2+102B3+102B4, 102E1+102E2+102E3+102E4, and 102F1+102F2+102F3+102F4. One intermediate result 103C1+103C2+103C3+103C4 may be obtained from a correspondence between 3 and a table of intermediate results of the first background value 103. Then, the nine intermediate results are accumulated, to obtain a value of a second voxel corresponding to the nine first voxels in Table 4.

The nine first voxels in the sliding window of the first data described above are all voxels indicating a background. If the sliding window of the first data includes a first voxel indicating a non-background, the calculation process may be understood with reference to the following process. As shown in Table 5, eight first voxels indicating a background and one first voxel indicating a non-background are included.

TABLE 5

| First background values of the nine first voxels in the sliding window of the first data | | |
|---|---|---|
| 101 | 102 | 103 |
| 101 | 102 | 500 |
| 101 | 101 | 101 |

In this case, for the eight first voxels indicating a background, refer to the solution of the nine first voxels. Intermediate results corresponding to background identifiers of the eight first voxels are separately obtained. Then, for a first voxel indicating a non-background in a second row and a third column, 500 may be multiplied by vectors at the nine positions of the convolution kernel in the four channel dimensions, and then results at a same position in different channel dimensions are added, to obtain intermediate results similar to Table 3. An intermediate result, for example, 500F1+500F2+500F3+500F4, in the second row and the third column is found from the intermediate results, and then the other eight intermediate results and 500F1+500F2+500F3+500F4 are accumulated, to obtain a value of a second voxel corresponding to the nine first voxels in Table 5.

The foregoing described process of determining a corresponding intermediate result and a correspondence between a background identifier and an intermediate result based on the first background value may also be referred to as a process of creating a table in the target convolution operator. For the nine voxels in the sliding window of the first data, the foregoing embodiment lists only a scenario of one channel dimension in a table lookup process based on a background identifier. The first data generally has a plurality of channel dimensions, and first background values in each channel dimension may be different. However, regardless of how many channel dimensions there are, sparse distribution of sub-data in each channel dimension is the same. Therefore, the channel dimensions share one first sparse distribution diagram. However, for different channel dimensions, background values mapped to background identifiers in the first sparse distribution diagram are different.

Figure 7:
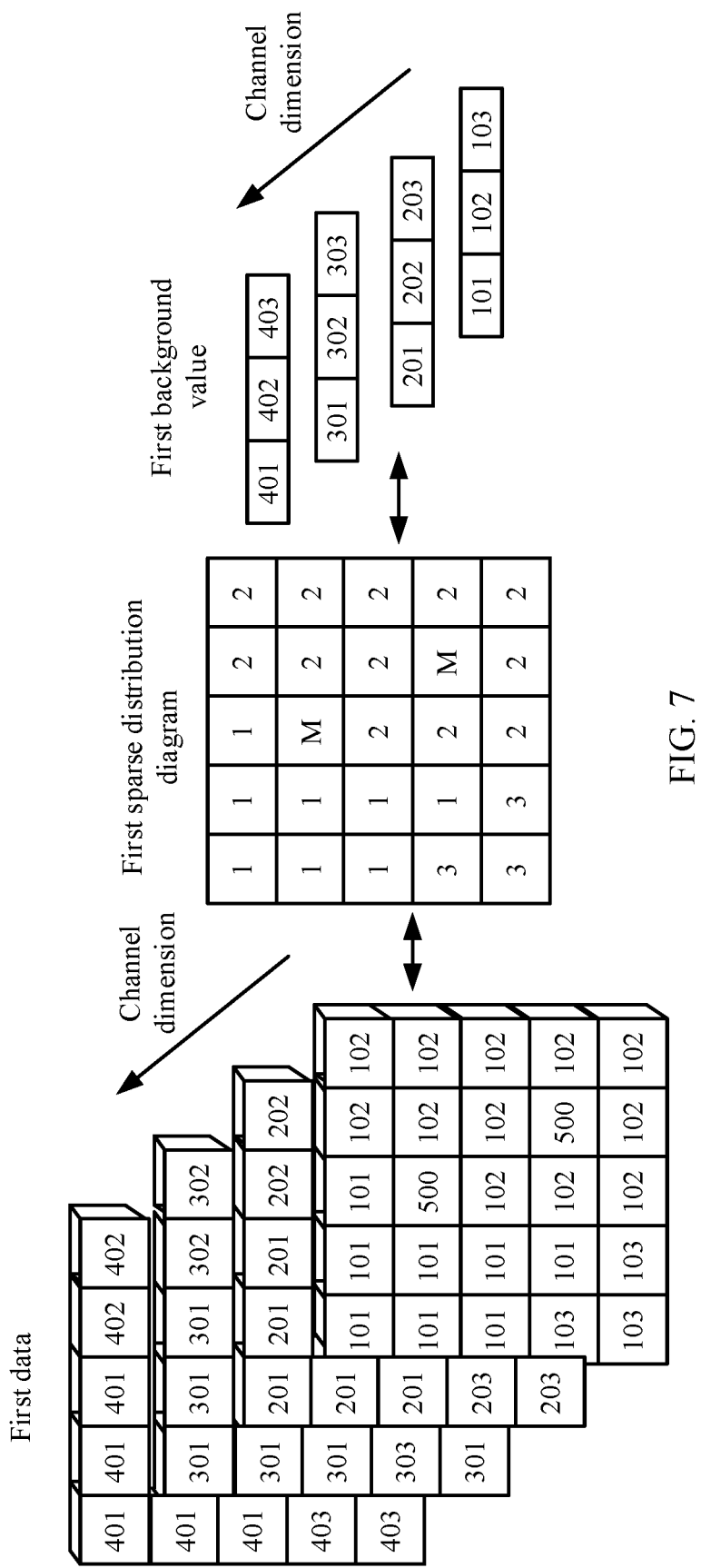
FIG. 7 is a schematic diagram of another example according to an embodiment of this application.

As shown in FIG. 7, the first data in the four channel dimensions described above has three first background values in the first channel dimension, which are respectively 101, 102, and 103; has three first background values in the second channel dimension, which are respectively 201, 202, and 203; has three first background values in the third channel dimension, which are respectively 301, 302, and 303; and has three first background values in the fourth channel dimension, which are respectively 401, 402, and 403. The four channel dimensions share one first sparse distribution diagram. In this way, in different channel dimensions, a same background identifier corresponds to intermediate results of different first background values. For example, a background identifier 1 corresponds to intermediate results of 101, 201, 301, and 401, a background identifier 2 corresponds to intermediate results of 102, 202, 302, and 402, and a background identifier 3 corresponds to intermediate results of 103, 203, 303, and 403. In this way, when values of second voxels of sub-data in different channel dimensions are calculated, the calculation process for the first channel dimension may be used, and a corresponding intermediate result is found in a table lookup manner, to obtain the values of the second voxels through calculation. There is no need to multiply the values of the nine voxels in the sliding window by the convolution kernel each time, and then perform accumulation, thereby implementing convolution acceleration in each channel dimension.

It may be learned from the foregoing embodiment of constructing a convolutional neural network and the examples in FIG. 4A to FIG. 4G that, in the solution of inputting at least one first background value and a first sparse distribution diagram, the convolutional neural network includes an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is from an operator that inputs the at least one first background value into a third convolution operator, and a position of the third convolution operator in the background inference subnet corresponds to the position of the target convolution operator in the operation subnet. For a structure including the three subnets, refer to FIG. 4D for understanding.

In addition, the convolutional neural network may alternatively include an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is preconfigured for the target convolution operator. Although the structure is not shown in a figure, the structure may be understood with reference to FIG. 4D by deleting a part of the background inference subnet based on FIG. 4D.

Figure 8:
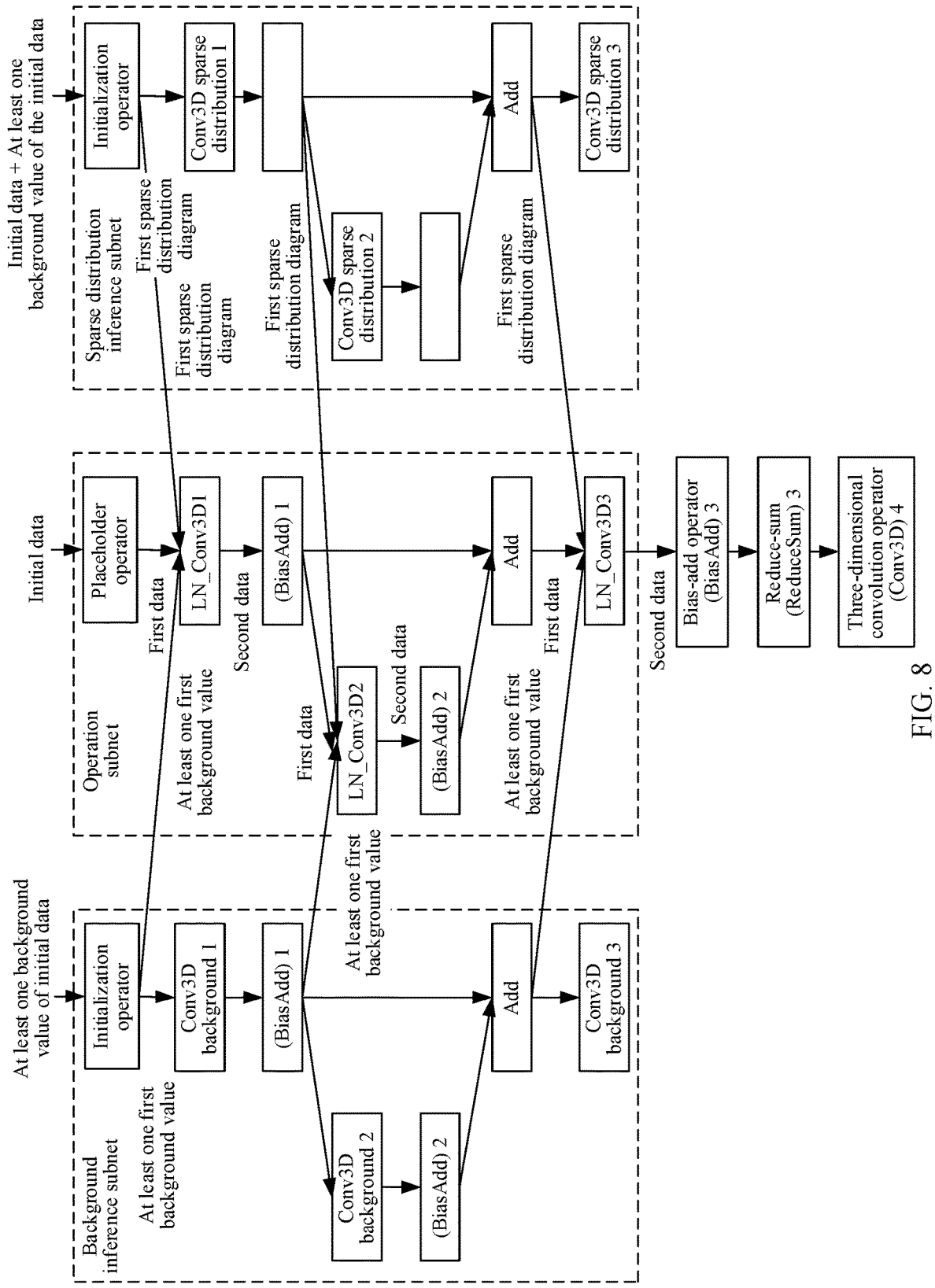
FIG. 8 is a schematic diagram of another embodiment of a method for processing three-dimensional data according to an embodiment of this application.

For understanding of a relationship between the operation subnet, the background inference subnet, and the sparse distribution inference subnet, refer to the process of constructing the convolutional neural network. With reference to FIG. 8, the following describes a process of processing three-dimensional data by using the convolutional neural network.

As shown in FIG. 8, initial data is input into a first operator (a placeholder operator) of the operation subnet, at least one first background value of the initial data is input into a first operator (an initialization operator) of the background inference subnet, and the initial data and the at least one first background value of the initial data are input into a first operator (an initialization operator) of the sparse distribution inference subnet. The initial data is three-dimensional data. For a 1$^{st}$ convolution operator in the operation subnet as the target convolution operator, the initial data is first data of the 1$^{st}$ convolution operator, and the at least one first background value of the initial data is at least one first background value of the first data. In this case, the first data is three-dimensional data in one channel dimension. The at least one first background value is represented in a form of a one-dimensional array, for example, {101, 102, 103}. If the target convolution operator is not a 1$^{st}$ convolution operator in the operation subnet, the first data has a plurality of channel dimensions, and a sparse distribution diagram of sub-data in each channel dimension is the same as the first sparse distribution diagram of the first data. This process may be understood with reference to the example in FIG. 7. In this case, the at least one first background value of the first data is represented in a form of a two-dimensional array. The first background values of the four channel dimensions in the example in FIG. 7 may be represented as:

$$\begin{Bmatrix} 101, 102, 103 \\ 201, 202, 203 \\ 301, 302, 303 \\ 401, 402, 403 \end{Bmatrix}$$

After receiving the at least one first background value of the initial data in the form of a one-dimensional array, the initialization operator in the background inference subnet does not process the at least one first background value of the initial data, and directly inputs the at least one first background value of the initial data as at least one first background value of the 1$^{st}$ convolution operator in the operation subnet into a Conv3D background 1 in the background inference subnet and LN_Conv3D1 in the operation subnet.

After receiving the initial data that is equivalent to the first data and the at least one background value of the initial data that is equivalent to the at least one first background value, the initialization operator in the sparse distribution inference subnet scans each first voxel in the first data one by one; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

Figure 6:
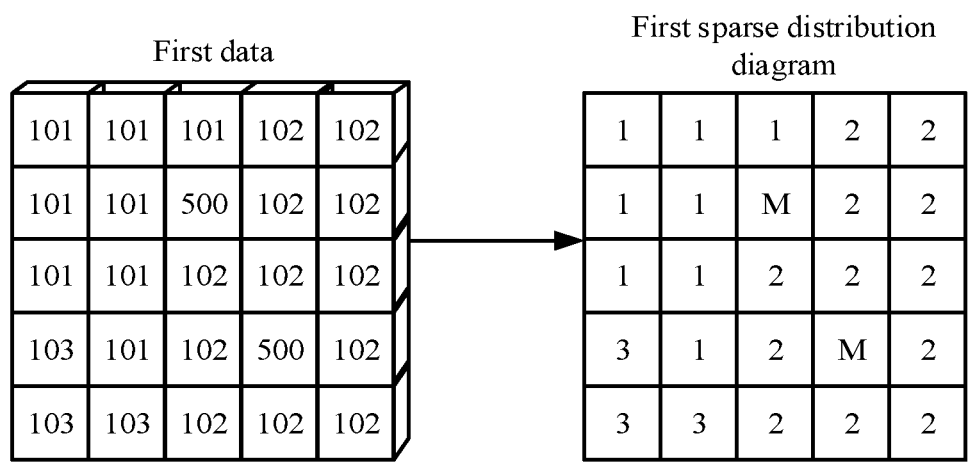
FIG. 6 is a schematic diagram of an example according to an embodiment of this application.

The process may be understood with reference to FIG. 6. As shown in FIG. 6, that the first data is 5*5 three-dimensional data is used as an example. The first data includes 25 first voxels, and each first voxel has a corresponding background value. In the example, the first background value in the form of a one-dimensional array may be represented as {101, 102, 103}. By scanning each first voxel, the background value 101 may be identified by 1 in the sparse distribution diagram, the background value 102 may be identified by 2 in the sparse distribution diagram, and the background value 103 may be identified by 3 in the sparse distribution diagram. In this way, the first sparse distribution diagram shown in FIG. 6 may be obtained based on positions of the 25 first voxels. Each "grid" in a target sparse distribution diagram is referred to as a point, and corresponds to one first voxel. A background identifier in the grid corresponds to a first background value of the first voxel at the corresponding position.

The initialization operator in the sparse distribution inference subnet may output the obtained first sparse distribution diagram to LN_Conv3D1 in the operation subnet, and may further transmit the target sparse distribution diagram as the first sparse distribution diagram to Conv3D sparse distribution 1 in the sparse distribution inference subnet.

As shown in FIG. 8, for different convolution operators (LN_Conv3D1, LN_Conv3D2, and LN_Conv3D3) in the operation subnet, input data is referred to as first data, input background values are referred to as first background values, and input sparse distribution diagrams are referred to as first sparse distribution diagrams. However, for different convolution operators, the input is different.

After receiving the first data, the at least one first background value, and the first sparse distribution diagram, LN_Conv3D1, LN_Conv3D2, or LN_Conv3D3 completes processing of the first data based on the processes of table creation and table lookup described in the foregoing embodiment, to obtain the value of the second voxel in the second data.

The foregoing describes the solution of inputting first data, at least one first background value of the first data, and a first sparse distribution diagram of the first data into a target convolution operator. In the foregoing solution, in a process of processing three-dimensional data, convolution acceleration may be implemented in the table lookup manner.

2. Inputting first data, at least one second background value, and a second sparse distribution diagram into a target convolution operator of a convolutional neural network.

Figure 9:
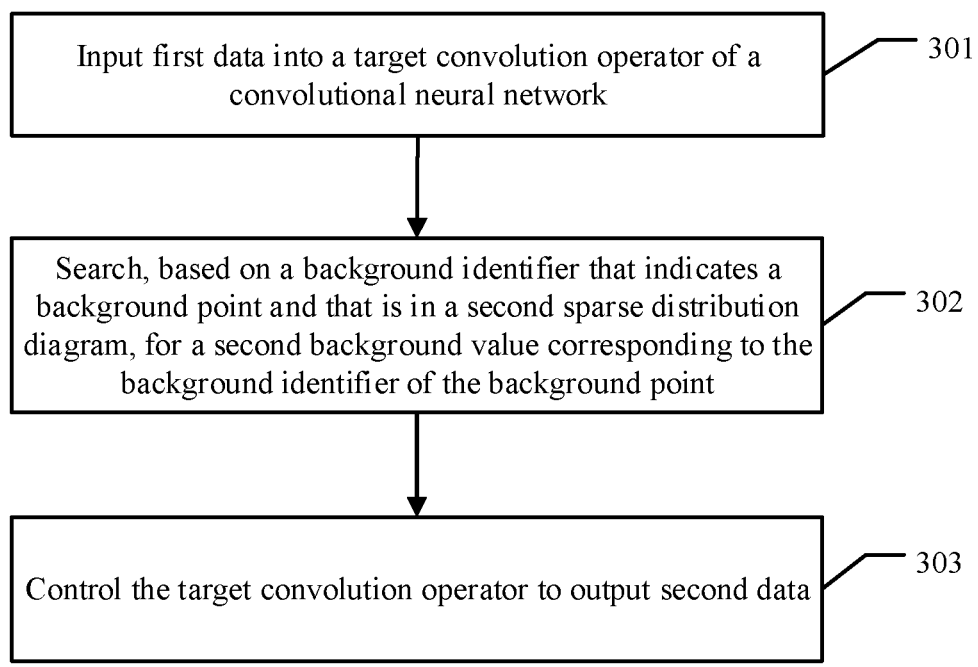
FIG. 9 is a schematic diagram of another embodiment of a method for processing three-dimensional data according to an embodiment of this application.

As shown in FIG. 9, another embodiment of a method for processing three-dimensional data according to an embodiment of this application includes the following operations.

301. Input first data into a target convolution operator of a convolutional neural network.

The convolutional neural network includes at least one first convolution operator, and the target convolution operator is any one of the at least one first convolution operator. The first data includes a plurality of first voxels, and at least one second background value obtained through convolution processing on at least one first background value of the first data and a second sparse distribution diagram obtained through a row identifier check operation on a first sparse distribution diagram are further input into the target convolution operator. The identifier check operation is checking that identifiers of points covered by a sliding window of the first sparse distribution diagram are all the same or not all the same, and the identifiers include a background identifier and a non-background identifier. The at least one first background value indicates at least one background in the first data, and the at least one first background value is in a one-to-one correspondence with the at least one background. The first sparse distribution diagram describes sparse distribution of the plurality of first voxels by using the background identifier and the non-background identifier, the background identifier indicates that a first voxel that corresponds to the background identifier and that is in the first data is a background, and the non-background identifier indicates that a first voxel that corresponds to the non-background identifier and that is in the first data is a non-background.

Figure 10:
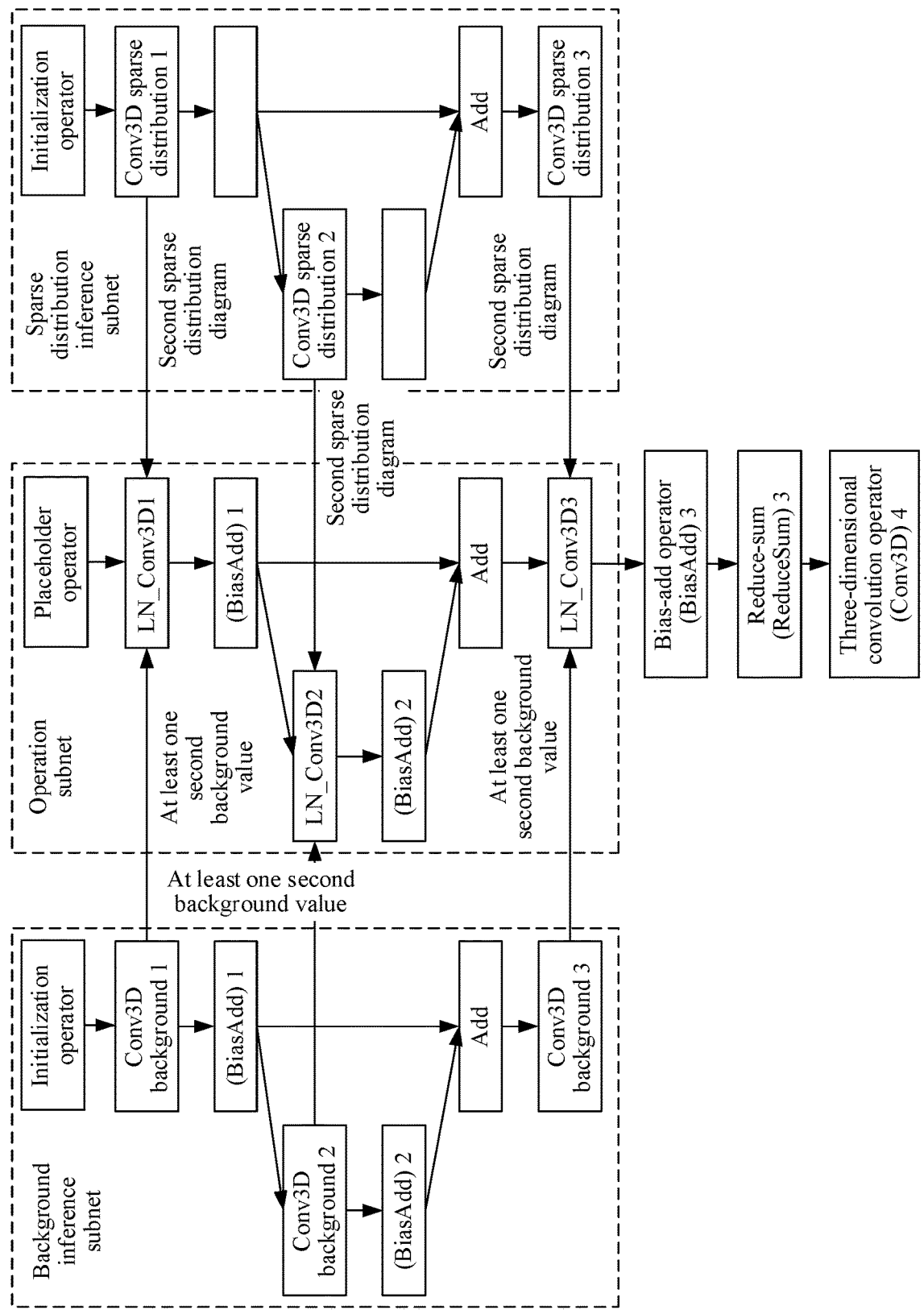
FIG. 10 is a schematic diagram of another embodiment of a method for processing three-dimensional data according to an embodiment of this application.

This embodiment may be understood with reference to FIG. 10. A process of obtaining the second background value from the first background value may be achieved by performing convolution processing on the first background value and a convolution kernel of a second convolution operator. For understanding of a first half of the foregoing process, refer to the process of obtaining an intermediate result by using the first background value and the convolution kernel. Then, the second background value may be obtained only by accumulating nine obtained intermediate results.

Figure 11:
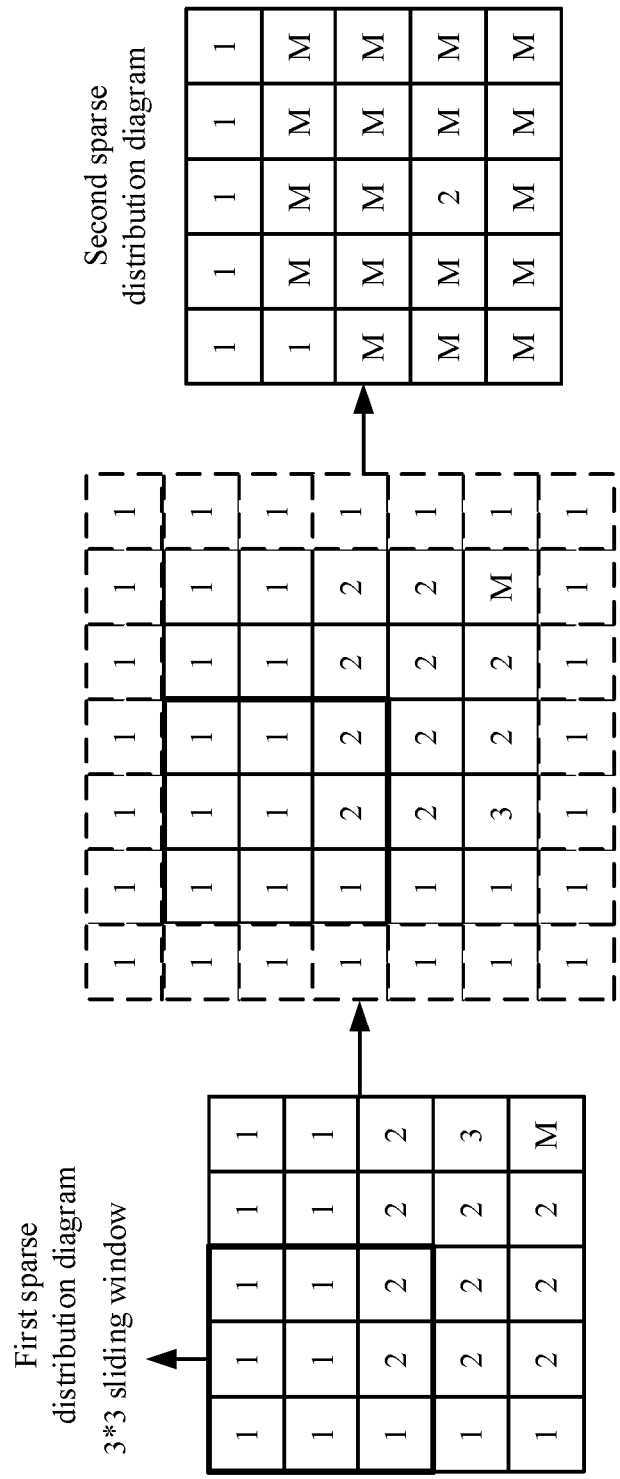
FIG. 11 is a schematic diagram of another example according to an embodiment of this application.

For a process from the first sparse distribution diagram to the second sparse distribution diagram, refer to FIG. 11 for understanding. By using a 3*3 sliding window, convolution processing may be performed on the first sparse distribution diagram input into Conv3D sparse distribution 1. That is, the 3*3 sliding window slides from left to right and from top to bottom in the first sparse distribution diagram based on, for example, sliding grid by grid. For grids on left, right, upper, and lower sides, a virtual row and a virtual column may be added in a virtual pending (pending) manner, and values of background identifiers in the virtual row and the virtual column may be marked with an identifier 1. In this way, background identifiers in nine grids in the sliding window are then checked each time. If the background identifiers in the nine grids in the sliding window are all the same, for example, are all 1, a background identifier of a point at a position at which the sliding window is located this time is set to 1. If the background identifiers in the nine grids in the sliding window are not all the same, an identifier of a point at a position at which the sliding window is located this time is set to M, indicating that the position is a non-background point. The second sparse distribution diagram may be obtained by sequentially performing sliding.

302. Search, based on a background identifier that indicates a background point and that is in the second sparse distribution diagram, for a second background value corresponding to the background identifier of the background point.

The second background value corresponding to the background identifier of the background point is a value of a second voxel that corresponds to the background point and that is in second data.

The second sparse distribution diagram and the second background value belong to the second data to be output by the target convolution operator. Therefore, when the second sparse distribution diagram and the second background value are known, a corresponding second background value may be directly found based on a background identifier in the second sparse distribution diagram.

For a search solution, if an operator input into the second data of the target convolution operator is a unary operator, that is, the unary operator has only input from the target convolution operator, searching for the second background value may alternatively be skipped, and the second background value is already stored at a corresponding position by default.

If an operator input into the second data of the target convolution operator is a binary operator, that is, the binary operator has input from another operator in addition to input from the target convolution operator, in this case, the second background value may be searched for.

303. Control the target convolution operator to output the second data, where the second data includes a plurality of second voxels.

According to the solution provided in this embodiment of this application, after receiving the first data, the second background value, and the second sparse distribution diagram, the target convolution operator may directly search for a corresponding second background value by using a background identifier in the second sparse distribution diagram. The found second background value is a value of a second voxel at a position corresponding to the background identifier. It may be learned that, in the solution provided in this embodiment of this application, a corresponding value may be directly found for a second voxel indicated by a background identifier in the second sparse distribution diagram, and no convolution processing process needs to be performed, thereby implementing convolution acceleration.

Based on the embodiment corresponding to FIG. 9, at least one first background value and a first sparse distribution diagram may be further input into the target convolution operator. That is, the following solution 3 may be performed.

3. Inputting first data, at least one first background value, at least one second background value, a first sparse distribution diagram, and a second sparse distribution diagram into a target convolution operator of a convolutional neural network.

This solution is equivalent to a combination of the solution 1 and the solution 2. A difference lies in a search order. Based on a background identifier that indicates a background point and that is in the second sparse distribution diagram, a second background value corresponding to the background identifier of the background point is first searched for. For a non-background point in the second sparse distribution diagram, based on a background identifier of a target point in the first sparse distribution diagram, a correspondence is searched for an intermediate result corresponding to the background identifier of the target point, where the target point is a point that indicates a background, that corresponds to the non-background point in the second sparse distribution diagram, and that is located in the first sparse distribution diagram; the correspondence indicates a relationship between an intermediate result of each of the at least one first background value and a background identifier corresponding to each of the at least one first background value, and an intermediate result of one first background value in the at least one first background value is obtained through calculation by using the first background value and a convolution kernel of the target convolution operator; and intermediate results in the correspondence are results obtained through calculation on the first background value at different positions of the convolution kernel, and the intermediate result corresponding to the background identifier of the target point is used to determine a value of a second voxel corresponding to the non-background point in the second sparse distribution diagram.

Figure 12:
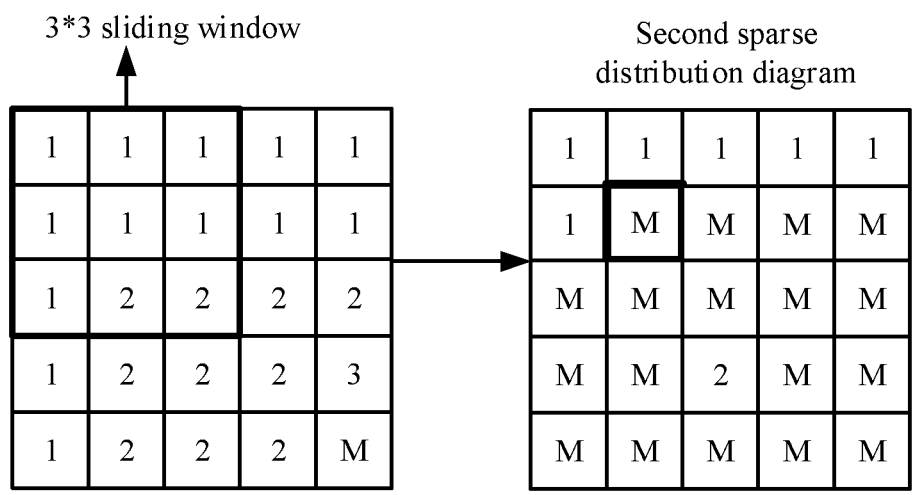
FIG. 12 is a schematic diagram of another example according to an embodiment of this application.

That is, for a non-background point in the second sparse distribution diagram, a sliding window in the first sparse distribution diagram is located, and nine points in the sliding window may be referred to as target points. Then, the nine points in the sliding window are used to obtain a value of a second voxel of the non-background point in the second sparse distribution diagram. As shown in FIG. 12, M in a second row and a second column in the second sparse distribution diagram may correspond to a sliding window in the first sparse distribution diagram. The sliding window includes nine points, all the nine points are background points, and background identifiers include seven 1s and two 2s. Then, the table lookup process described in the solution 1 may be performed based on the nine background identifiers and positions of the nine background identifiers in the sliding window, and the value of the second voxel corresponding to the non-background point in the second sparse distribution diagram may be obtained by accumulating found intermediate results. If the sliding window of the first sparse distribution diagram includes a non-background identifier, for a background identifier part, intermediate results may be searched for and accumulated. For a point of the non-background identifier, with reference to the description in the solution 1, calculation may be performed by using a value of a first voxel corresponding to the point of the non-background identifier and the convolution kernel of the target convolution operator, to obtain an intermediate result. Then, the intermediate result is accumulated with an intermediate result of a point of a background identifier in the first sparse distribution diagram, to obtain the value of the second voxel corresponding to the non-background point in the second sparse distribution diagram.

The convolutional neural network in the solution 3 may include an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value is from an operator that inputs the at least one first background value into a third convolution operator, the at least one second background value is obtained through convolution processing on the at least one first background value by the third convolution operator, and a position of the third convolution operator in the background inference subnet corresponds to the position of the target convolution operator in the operation subnet. The structure may be understood with reference to FIG. 4F.

The convolutional neural network in the solution 3 may alternatively include an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value and the at least one second background value are preconfigured for the target convolution operator. The structure may be understood with reference to FIG. 4G.

Figure 4G:
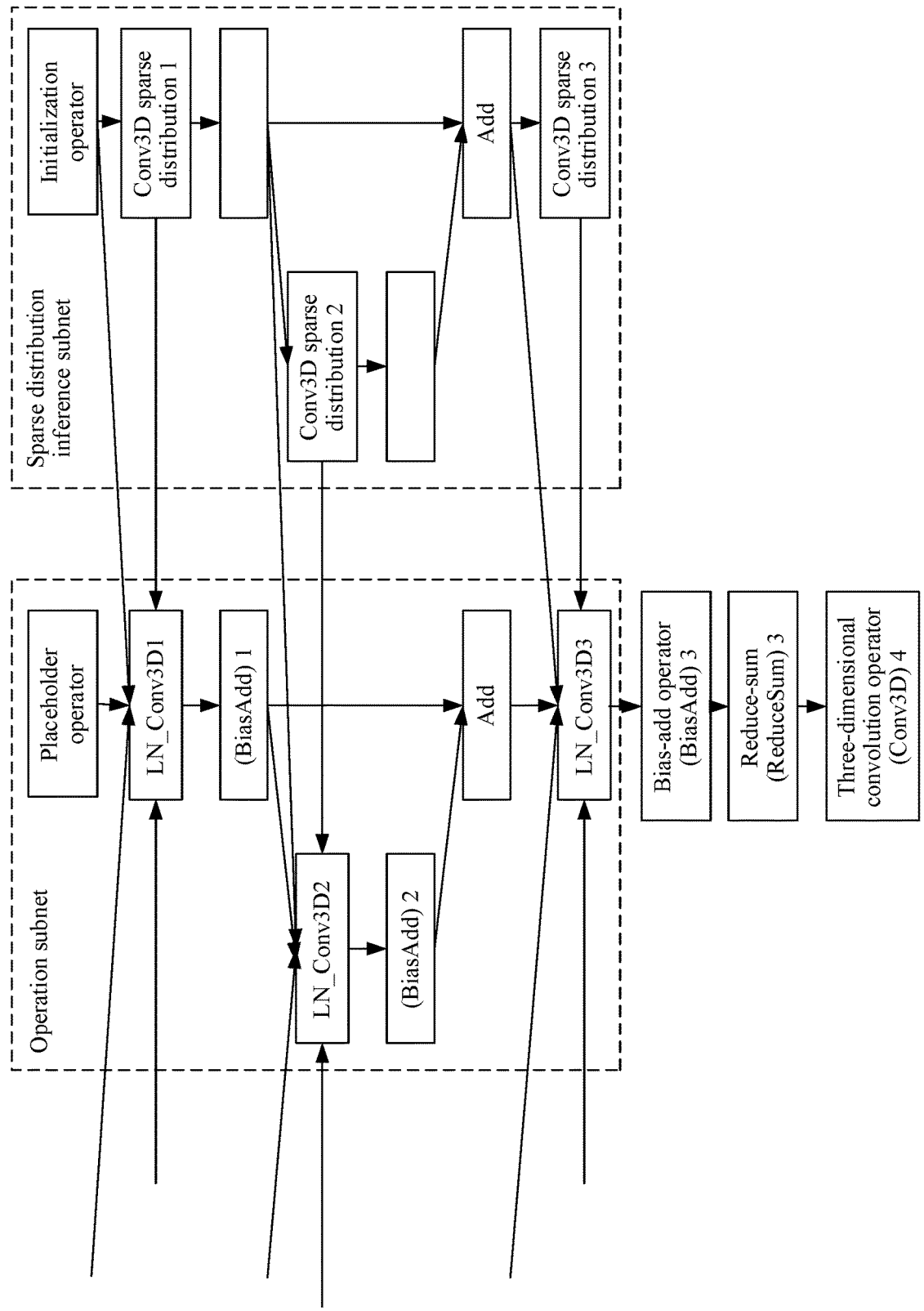

With reference to the structures in FIG. 4F and FIG. 4G, if the target convolution operator is a $1^{st}$ convolution operator in the operation subnet, the first sparse distribution diagram is obtained by scanning each first voxel in the first data one by one by an initialization operator in the sparse distribution inference subnet; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

This process is the same as the corresponding process in the solution 1. In addition, for forms of the at least one first background value, the at least one second background value, the first data, and the second data, refer to the descriptions of the solution 1 and the solution 2 for understanding. Details are not described herein.

In the solution described in the solution 3, compared with the solution 1 and the solution 2, two searches may be performed, and a convolution acceleration effect is further improved.

In the foregoing solution provided in this embodiment of this application, the operation subnet, the background inference subnet, and the sparse distribution inference subnet cooperate with each other, and different functions may be implemented by using different subnets. For example, background values in different phases are inferred by using the background inference subnet, and background sparse distribution in different phases is inferred by using the sparse distribution inference subnet. Further, in combination with the operation subnet, with reference to a background value in a corresponding phase, pre-convolution processing may be completed in different phases of processing three-dimensional data. When a second voxel is processed, a corresponding convolution result is searched for with reference to a background identifier in the corresponding phase. It may be learned that convolution processing may be efficiently performed through cooperation of the three subnets, thereby improving a convolution processing speed.

For ease of description of an effect of this application, the following provides a description with reference to a set of experimental data. In this embodiment of this application, single-core performance data of a ForkNet convolutional network tested on an ArmV8.2 architecture server is shown in Table 6.

ForkNet is a convolutional network used for 3D semantic segmentation and 3D reconstruction. Input data of ForkNet is a three-dimensional array that stores a spatial voxel value. Each point in the three-dimensional array has three values, which are respectively corresponding to air (a background 0), an object surface (a background 1), and an area that is not detected by a depth camera (a background 2). Sparse acceleration may be performed on 12 convolution operators in ForkNet, and acceleration effects are shown in Table 6 row by row. A background and sparse distribution change after each layer of convolution. However, a quantity of backgrounds is always 3. Table 6 lists proportions of three backgrounds in input data of each layer of convolution, and "density" means a proportion of a non-background point. In the table, a "Performance" column is statistics on performance data, a "This Application" column is a time consumed after the solution provided in this embodiment of this application is used, a "Dense" column is a time consumed when a dense Conv3D operator is used, and a "Time Consumption Ratio" column is obtained by dividing the "This Application" column by the "Dense" column.

TABLE 6

Single-core performance statistics table of a convolution operator in a ForkNet convolutional network

| | Proportion | | | | Performance | | |
| --- | --- | --- | --- | --- | --- | --- | --- |
| | Background 0 | Background 1 | Background 2 | Density | This Application (ms) | Dense (ms) | Time Consumption Ratio |
| Conv3D1 | 23.09% | 0.08% | 62.47% | 14.43% | 3.685 | 4.759 | 77.43% |
| Conv3D2 | 16.76% | 0.00% | 55.66% | 27.58% | 36.799 | 78.759 | 46.72% |
| Conv3D3 | 11.36% | 0.00% | 49.35% | 39.29% | 75.151 | 149.745 | 50.19% |
| Conv3D4 | 7.08% | 0.00% | 43.53% | 49.38% | 85.823 | 149.194 | 57.52% |
| Conv3D5 | 3.99% | 0.00% | 38.20% | 57.80% | 94.951 | 148.544 | 63.92% |
| Conv3D6 | 3.99% | 0.00% | 38.20% | 57.80% | 95.258 | 148.846 | 64.00% |
| Conv3D7 | 1.99% | 0.00% | 33.41% | 64.60% | 104.004 | 148.656 | 69.96% |
| Conv3D8 | 0.77% | 0.00% | 29.09% | 70.14% | 112.409 | 148.881 | 75.50% |
| Conv3D9 | 0.21% | 0.00% | 25.23% | 74.57% | 120.299 | 148.775 | 80.86% |
| Conv3D10 | 0.00% | 0.00% | 21.73% | 78.27% | 124.177 | 148.781 | 83.46% |
| Conv3D11 | 0.00% | 0.00% | 18.66% | 81.34% | 127.131 | 148.674 | 85.51% |
| Conv3D12 | 0.00% | 0.00% | 15.93% | 84.07% | 130.031 | 149.146 | 87.18% |
| Total | | | | | 1109.718 | 1572.76 | 70.56% |

As shown in Table 6, in the ForkNet network, generalized sparsity of input data is effectively utilized, and a total time consumed by the 12 convolution operators is reduced to 70.56% of a time consumed by dense Conv3D. A sparse background of the input data is not equal to 0 and is not unique, indicating that embodiments the present disclosure fully utilize the generalized sparsity.

In this application, a plurality of convolution operators are accelerated by fully using a multi-background data feature, so that a generalized sparse scenario that cannot be covered by a narrow-sense sparse optimization method may be covered, and an entire-network acceleration effect is achieved.

The foregoing describes the method for constructing a convolutional neural network and the method for processing three-dimensional data according to embodiments of this application. With reference to an accompanying drawing, the following describes an apparatus according to an embodiment of this application.

Figure 13:
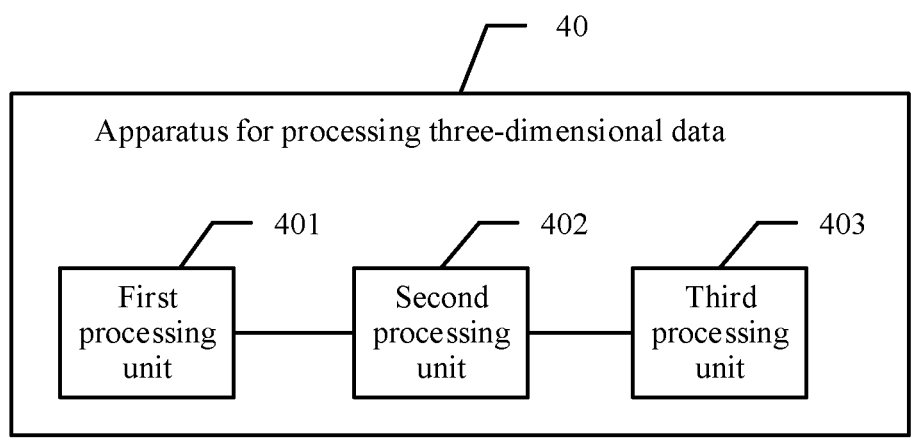
FIG. 13 is a schematic diagram of an embodiment of an apparatus for processing three-dimensional data according to an embodiment of this application.

As shown in FIG. 13, an embodiment of an apparatus 40 for processing three-dimensional data according to an embodiment of this application includes:

a first processing unit 401, configured to input first data, at least one first background value of the first data, and a first sparse distribution diagram of the first data into a target convolution operator of a convolutional neural network, where the convolutional neural network includes at least one first convolution operator, and the target convolution operator is any one of the at least one first convolution operator; the first data includes a plurality of first voxels, the at least one first background value indicates at least one background in the first data, and the at least one first background value is in a one-to-one correspondence with the at least one background; the first sparse distribution diagram describes sparse distribution of the plurality of first voxels by using a background identifier and a non-background identifier, the background identifier indicates that a first voxel that corresponds to the background identifier and that is in the first data is a background, and the non-background identifier indicates that a first voxel that corresponds to the non-background identifier and that is in the first data is a non-background;

a second processing unit 402, configured to search, based on a background identifier of a background point that corresponds to a first voxel indicating a background in the first data input by the first processing unit 401 and that is in the first sparse distribution diagram, a correspondence for an intermediate result corresponding to the background identifier of the background point, where the correspondence indicates a relationship between an intermediate result of each of the at least one first background value and a background identifier corresponding to each of the at least one first background value, an intermediate result of one first background value in the at least one first background value is obtained through calculation by using the first background value and a convolution kernel of the target convolution operator, and the intermediate result corresponding to the background identifier of the background point is used to determine a value of a second voxel in second data; and a third processing unit 403, configured to control the target convolution operator to output the second data, where the second data includes a plurality of second voxels.

According to the solution provided in this embodiment of this application, before an intermediate result is searched for from a first correspondence, an intermediate result of each first background value and the convolution kernel is calculated, for example, an intermediate result 1 of 101 and the convolution kernel, an intermediate result 2 of 102 and the convolution kernel, and an intermediate result 3 of 103 and the convolution kernel. Because the first background value corresponds to the background identifier, a correspondence between a background identifier and a convolution result may be established, for example, 1→the intermediate result 1, 2→the intermediate result 2, and 3→the intermediate result 3. Generally, the first data includes many first voxels. In a conventional technology, a process of performing convolution processing on the first data is a process of performing calculation on values of the first voxels and the convolution kernel one by one. However, most of the first voxels indicate a background, and values of the first voxels indicating a background have much repetition. A speed of calculation performed on the values of the first voxels and the convolution kernel one by one is very low. However, in this application, for each first background value, calculation is first performed with the convolution kernel to obtain an intermediate result, and then a correspondence between the intermediate result and a background identifier is stored. During convolution processing of the first data, for the first voxel indicating a background in the first data, the intermediate result may be directly found by searching the correspondence, and then the value of the second voxel in the second data may be obtained by using the intermediate result. There is no need to perform a large amount of calculation on a value of each first voxel and the convolution kernel, thereby reducing calculation overheads and implementing convolution acceleration.

In some embodiments, the convolutional neural network includes an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is from an operator that inputs the at least one first background value into a third convolution operator, and a position of the third convolution operator in the background inference subnet corresponds to the position of the target convolution operator in the operation subnet.

In some embodiments, the convolutional neural network includes an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, and a position of the second convolution operator in the sparse distribution inference subnet corresponds to a position of the target convolution operator in the operation subnet. The at least one first background value is preconfigured for the target convolution operator.

In some embodiments, intermediate results in the correspondence are results obtained through calculation on the first background value at different positions of the convolution kernel. The second processing unit 402 is configured to: for each first voxel that indicates a background and that is in a sliding window of the first data, search, based on a background identifier that corresponds to each first voxel indicating a background and that is in the first sparse distribution diagram and a position that is of each first voxel indicating a background and that is in the sliding window, the correspondence for an intermediate result corresponding to the background identifier at a corresponding position, where a size of the sliding window of the first data is the same as a size of the convolution kernel of the target convolution operator.

In some embodiments, the second processing unit 402 is further configured to accumulate intermediate results of the first voxel that indicates a background and that is in the sliding window of the first data, to obtain a value of one second voxel, where all first voxels in the sliding window of the first data indicate a background.

In some embodiments, the second processing unit 402 is further configured to accumulate intermediate results of the first voxel that indicates a background and that is in the sliding window of the first data, and further add an intermediate result of a first voxel that indicates a non-background, to obtain a value of one second voxel, where the intermediate result of the first voxel that indicates a non-background is obtained through calculation by using a value of the first voxel that indicates a non-background and the convolution kernel.

In some embodiments, the target convolution operator is a $1^{st}$ convolution operator in the operation subnet, and in this case, the first sparse distribution diagram is obtained by scanning each first voxel in the first data one by one by an initialization operator in the sparse distribution inference subnet; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

In some embodiments, the at least one first background value of the first data is represented in a form of a one-dimensional array.

In some embodiments, the target convolution operator is not a $1^{st}$ convolution operator in the operation subnet, and in this case, the first data has a plurality of channel dimensions, and a sparse distribution diagram of sub-data in each channel dimension is the same as the first sparse distribution diagram of the first data.

In some embodiments, first background values of sub-data in different channel dimensions are different.

In some embodiments, the at least one first background value of the first data is represented in a form of a two-dimensional array.

In some embodiments, the first data is a multidimensional array of video data, voice data, or text data.

For understanding of a corresponding function of the apparatus 40 for processing three-dimensional data, refer to related content in the part of the method for processing three-dimensional data. Details are not described herein.

Figure 14:
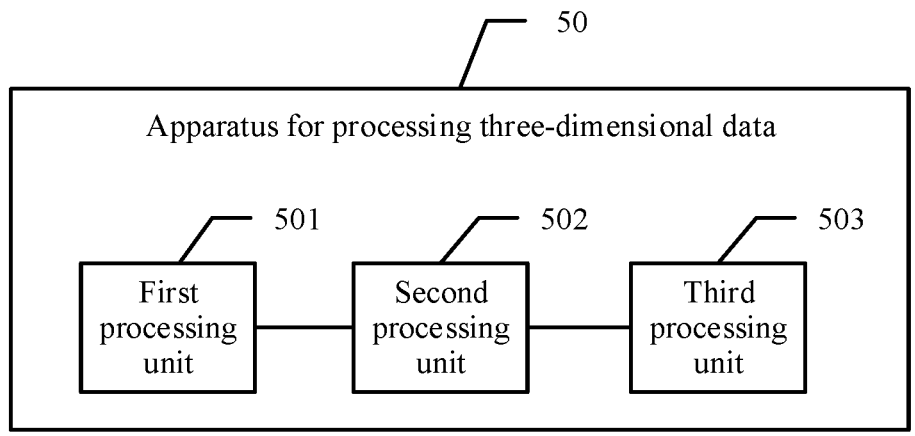
FIG. 14 is a schematic diagram of an embodiment of an apparatus for processing three-dimensional data according to an embodiment of this application.

As shown in FIG. 14, an embodiment of an apparatus 50 for processing three-dimensional data according to an embodiment of this application includes:

a first processing unit 501, configured to input first data into a target convolution operator of a convolutional neural network, where the convolutional neural network includes at least one first convolution operator, and the target convolution operator is any one of the at least one first convolution operator; the first data includes a plurality of first voxels, and at least one second background value obtained through convolution processing on at least one first background value of the first data and a second sparse distribution diagram obtained through a row identifier check operation on a first sparse distribution diagram are further input into the target convolution operator; the identifier check operation is checking that identifiers of points covered by a sliding window of the first sparse distribution diagram are all the same or not all the same, and the identifiers include a background identifier and a non-background identifier; the at least one first background value indicates at least one background in the first data, and the at least one first background value is in a one-to-one correspondence with the at least one background; the first sparse distribution diagram describes sparse distribution of the plurality of first voxels by using the background identifier and the non-background identifier, the background identifier indicates that a first voxel that corresponds to the background identifier and that is in the first data is a background, and the non-background identifier indicates that a first voxel that corresponds to the non-background identifier and that is in the first data is a non-background;

a second processing unit 502, configured to search, based on a background identifier that indicates a background point and that is in the second sparse distribution diagram, for a second background value corresponding to the background identifier of the background point, where the second background value corresponding to the background identifier of the background point is a value of a second voxel that corresponds to the background point and that is in second data; and a third processing unit 503, configured to control the target convolution operator to output the second data, where the second data includes a plurality of second voxels.

According to the solution provided in this embodiment of this application, after receiving the first data, the second background value, and the second sparse distribution diagram, the target convolution operator may directly search for a corresponding second background value by using a background identifier in the second sparse distribution diagram. The found second background value is a value of a second voxel at a position corresponding to the background identifier. It may be learned that, in the solution provided in this embodiment of this application, a corresponding value may be directly found for a second voxel indicated by a background identifier in the second sparse distribution diagram, and no convolution processing process needs to be performed, thereby implementing convolution acceleration.

In some embodiments, the second processing unit 502 is further configured to: for a non-background point in the second sparse distribution diagram, search, based on a background identifier of a target point in the first sparse distribution diagram, a correspondence for an intermediate result corresponding to the background identifier of the target point, where the target point is a point that indicates a background, that corresponds to the non-background point in the second sparse distribution diagram, and that is located in the first sparse distribution diagram; the correspondence indicates a relationship between an intermediate result of each of the at least one first background value and a background identifier corresponding to each of the at least one first background value, and an intermediate result of one first background value in the at least one first background value is obtained through calculation by using the first background value and a convolution kernel of the target convolution operator; and intermediate results in the correspondence are results obtained through calculation on the first background value at different positions of the convolution kernel, and the intermediate result corresponding to the background identifier of the target point is used to determine a value of a second voxel corresponding to the non-background point in the second sparse distribution diagram.

In some embodiments, the convolutional neural network includes an operation subnet, a background inference subnet, and a sparse distribution inference subnet, and network structures of both the background inference subnet and the sparse distribution inference subnet are the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value is from an operator that inputs the at least one first background value into a third convolution operator, the at least one second background value is obtained through convolution processing on the at least one first background value by the third convolution operator, and a position of the third convolution operator in the background inference subnet corresponds to the position of the target convolution operator in the operation subnet.

In some embodiments, the convolutional neural network includes an operation subnet and a sparse distribution inference subnet, and a network structure of the sparse distribution inference subnet is the same as a network structure of the operation subnet. The operation subnet includes the at least one first convolution operator. The first sparse distribution diagram is from an operator that inputs the first sparse distribution diagram into a second convolution operator, the second sparse distribution diagram is obtained through the row identifier check operation on the first sparse distribution diagram by the second convolution operator, and a position of the second convolution operator in the sparse distribution inference subnet corresponds to a position of the target convolution operator in the operation subnet. The at least one first background value and the at least one second background value are preconfigured for the target convolution operator.

In some embodiments, the second processing unit 502 is further configured to accumulate found intermediate results corresponding to all target points, to obtain the value of the second voxel corresponding to the non-background point, where all points that correspond to the non-background point and that are located in the first sparse distribution diagram are points indicating a background.

In some embodiments, the second processing unit 502 is further configured to accumulate found intermediate results corresponding to all target points, and further add an intermediate result corresponding to a dense point that corresponds to the non-background point and that is located in the first sparse distribution diagram, to obtain the value of the second voxel corresponding to the non-background point, where the dense point is a point that indicates a non-background and that is in the first sparse distribution diagram, and the intermediate result corresponding to the dense point is obtained through calculation by using the convolution kernel and a value of a first voxel that indicates a non-background, that corresponds to the dense point, and that is in the first data.

In some embodiments, the target convolution operator is a $1^{st}$ convolution operator in the operation subnet, and in this case, the first sparse distribution diagram is obtained by scanning each first voxel in the first data one by one by an initialization operator in the sparse distribution inference subnet; for the first voxel indicating a background, based on a first background value corresponding to the first voxel indicating a background, a corresponding background identifier is written into a corresponding point in a blank bitmap corresponding to the first data, and the corresponding point is a point that is in the blank bitmap and that corresponds to the first voxel indicating a background; and for a first voxel indicating a non-background, a non-background identifier is written into a point that is in the blank bitmap and that corresponds to the first voxel indicating a non-background.

In some embodiments, the at least one first background value of the first data is represented in a form of a one-dimensional array, and the at least one second background value is represented in a form of a two-dimensional array.

In some embodiments, the target convolution operator is not a $1^{st}$ convolution operator in the operation subnet, and in this case, the first data has a plurality of channel dimensions, and a sparse distribution diagram of sub-data in each channel dimension is the same as the first sparse distribution diagram of the first data.

In some embodiments, first background values of sub-data in different channel dimensions are different.

In some embodiments, the at least one first background value of the first data is represented in a form of a two-dimensional array.

In some embodiments, the first data is a multidimensional array of video data, voice data, or text data.

For understanding of a corresponding function of the apparatus 50 for processing three-dimensional data, refer to related content in the part of the method for processing three-dimensional data. Details are not described herein.

Figure 15:
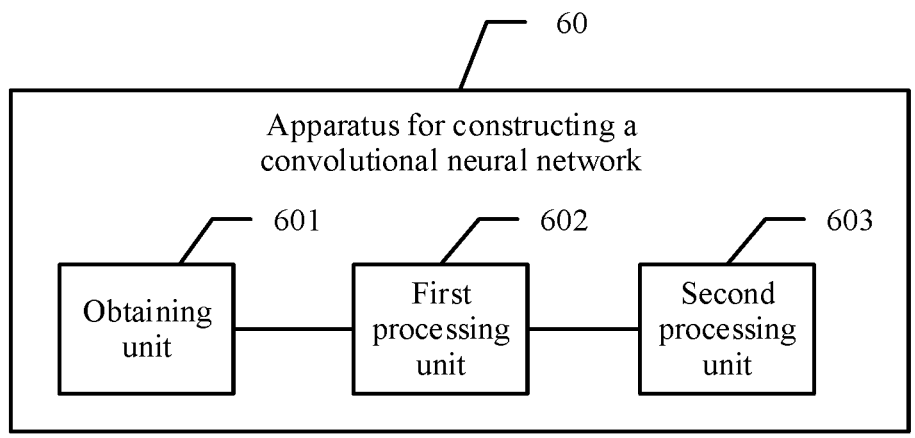
FIG. 15 is a schematic diagram of an embodiment of an apparatus for constructing a convolutional neural network according to an embodiment of this application.

As shown in FIG. 15, an embodiment of an apparatus 60 for constructing a convolutional neural network according to an embodiment of this application includes:

an obtaining unit 601, configured to obtain an initial convolutional neural network, where the initial convolutional neural network includes an operation subnet, and the operation subnet includes at least one first convolution operator;

a first processing unit 602, configured to obtain, through replication, a sparse distribution inference subnet based on the operation subnet; and a second processing unit 603, configured to construct at least one of a first input relationship and a second input relationship, where the first input relationship is an input relationship from a second convolution operator in the sparse distribution inference subnet to a first convolution operator at a corresponding position, and the second input relationship is an input relationship from an operator that is in the sparse distribution inference subnet and that inputs data into the second convolution operator to the first convolution operator at the corresponding position, to obtain a target convolutional neural network.

According to the solution provided in this embodiment of this application, based on the initial convolutional neural network used to process only three-dimensional data, the background inference subnet and the sparse distribution inference subnet with the same structure are added for the operation subnet. In this way, it may be ensured that in a process in which convolution operators at different positions in the operation subnet perform convolution processing on the three-dimensional data, a background value at a corresponding position may be obtained from the background inference subnet, and a sparse distribution diagram at a corresponding position may be obtained from the sparse distribution inference subnet. Therefore, it may be ensured that the target convolutional neural network constructed in this application may improve a convolution processing speed.

In some embodiments, before the target convolutional neural network is obtained, the first processing unit 602 is further configured to obtain, through replication, a background inference subnet based on the operation subnet. The second processing unit 603 is further configured to construct at least one of a third input relationship and a fourth input relationship, where the third input relationship is an input relationship from a third convolution operator in the background inference subnet to a first convolution operator at a corresponding position, the fourth input relationship is an input relationship from an operator that is in the background inference subnet and that inputs data into the third convolution operator to the first convolution operator at the corresponding position, the first input relationship corresponds to the third input relationship, and the second input relationship corresponds to the fourth input relationship.

In some embodiments, the first processing unit 602 is further configured to determine the operation subnet from the initial convolutional neural network, where input data of all operators in the operation subnet has same sparse distribution in a channel dimension, output data of all the operators has same sparse distribution in the channel dimension, and the channel dimension represents a dimension different from three-dimensional space.

For understanding of a corresponding function of the apparatus 60 for constructing a convolutional neural network, refer to related content in the part of the method for constructing a convolutional neural network. Details are not described herein.

Figure 16:
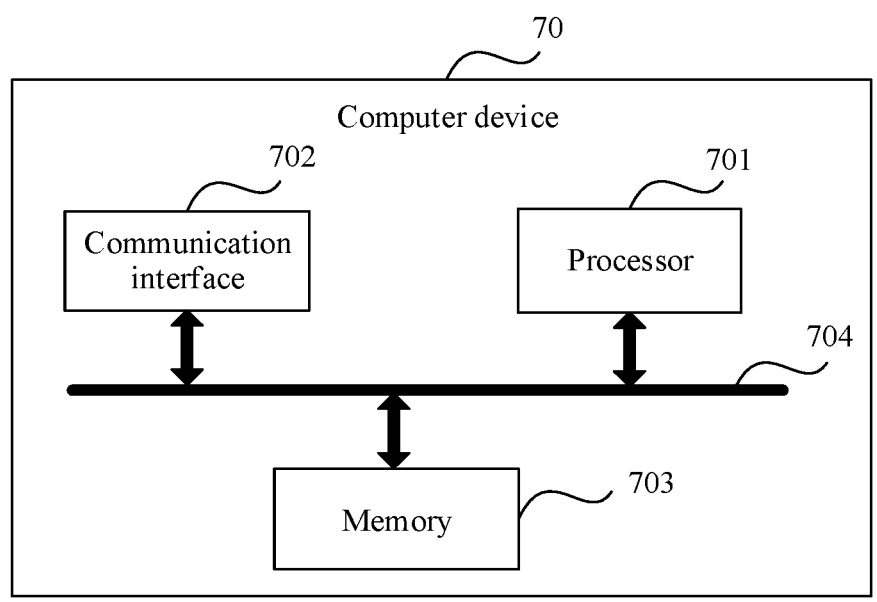
FIG. 16 is a schematic diagram of an embodiment of a computer device according to an embodiment of this application.

FIG. 16 shows a possible schematic diagram of a logical structure of a computer device 70 according to an embodiment of this application. The computer device 70 may be the apparatus 40 for processing three-dimensional data, the apparatus 50 for processing three-dimensional data, or the apparatus 60 for constructing a convolutional neural network. The computer device 70 includes a processor 701, a communication interface 702, a memory 703, and a bus 704. The processor 701, the communication interface 702, and the memory 703 are connected to each other by using the bus 704. In this embodiment of this application, the processor 701 is configured to control and manage an action of the computer device 70. For example, the processor 701 is configured to perform obtaining and processing processes in the method embodiments in FIG. 3 to FIG. 12, and the communication interface 702 is configured to support the computer device 70 in performing communication. The memory 703 is configured to store program code and data of the computer device 70.

The processor 701 may be a central processing unit, a general-purpose processor, a digital signal processor, an application-specific integrated circuit, a field programmable gate array or another programmable logic device, a transistor logic device, a hardware component, or any combination thereof. The processor 701 may implement or execute various example logical blocks, modules, and circuits described with reference to content disclosed in this application. Alternatively, the processor 701 may be a combination of processors implementing a computing function, for example, a combination of one or more microprocessors, or a combination of a digital signal processor and a microprocessor. The bus 704 may be a peripheral component interconnect (PCI) bus, an extended industry standard architecture (EISA) bus, or the like. Buses may be classified into an address bus, a data bus, a control bus, and the like. For ease of representation, only one thick line is for representing the bus in FIG. 16, but this does not mean that there is only one bus or only one type of bus.

In another embodiment of this application, a computer-readable storage medium is further provided. The computer-readable storage medium stores computer-executable instructions. When a processor of a device executes the computer-executable instructions, the computer device performs the methods for constructing a convolutional neural network in FIG. 3 to FIG. 4G, or performs the methods for processing three-dimensional data in FIG. 5 to FIG. 12.

In another embodiment of this application, a computer program product is further provided. The computer program product includes computer-executable instructions, and the computer-executable instructions are stored in a computer-readable storage medium. When a processor of a device executes the computer-executable instructions, the computer device performs the methods for constructing a convolutional neural network in FIG. 3 to FIG. 4G, or performs the methods for processing three-dimensional data in FIG. 5 to FIG. 12.

In another embodiment of this application, a chip system is further provided. The chip system includes a processor. The processor is configured to implement the methods for constructing a convolutional neural network in FIG. 3 to FIG. 4G, or perform the methods for processing three-dimensional data in FIG. 5 to FIG. 12. In a possible embodiment, the chip system may further include a memory. The memory is configured to store program instructions and data for an apparatus for inter-process communication. The chip system may include a chip, or may include a chip and another discrete component.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in embodiments of this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method for processing three-dimensional data, comprising:

inputting first data, at least one first background value of the first data, and a first sparse distribution diagram of the first data into a target convolution operator of a convolutional neural network, wherein the convolutional neural network comprises at least one first convolution operator, and the target convolution operator is any one of the at least one first convolution operator, wherein the first data comprises a plurality of first voxels, the at least one first background value indicates at least one background in the first data, and the at least one first background value is in a one-to-one correspondence with the at least one background, and wherein the first sparse distribution diagram describes a sparse distribution of the plurality of first voxels by using a background identifier and a non-background identifier, the background identifier indicates that a first voxel that corresponds to the background identifier in the first data is a background, and the non-background identifier indicates that a first voxel that corresponds to the non-background identifier in the first data is a non-background;

searching, based on a background identifier of a background point that corresponds to a first voxel indicating a background in the first data in the first sparse distribution diagram, a correspondence for an intermediate result corresponding to the background identifier of the background point, wherein the correspondence indicates a relationship between an intermediate result of each of the at least one first background value and a background identifier corresponding to each of the at least one first background value, the intermediate result of each first background value in the at least one first background value is obtained through calculation by using the first background value and a convolution kernel of the target convolution operator, and the intermediate result corresponding to the background identifier of the background point is used to determine a value of a second voxel in second data; and controlling the target convolution operator to output the second data, wherein the second data comprises a plurality of second voxels.

2. The method according to claim 1, wherein the convolutional neural network comprises an operation subnet, a background inference subnet, and a sparse distribution inference subnet, and network structures of both the background inference subnet and the sparse distribution inference subnet are the same as a network structure of the operation subnet, wherein the operation subnet comprises the at least one first convolution operator, wherein the first sparse distribution diagram is from an operator that inputs the first sparse distribution diagram into a second convolution operator, and a position of the second convolution operator in the sparse distribution inference subnet corresponds to a position of the target convolution operator in the operation subnet, and wherein the at least one first background value is from an operator that inputs the at least one first background value into a third convolution operator, and a position of the third convolution operator in the background inference subnet corresponds to the position of the target convolution operator in the operation subnet.

3. The method according to claim 2, wherein the target convolution operator is a $1^{st}$ convolution operator in the operation subnet and the first sparse distribution diagram is obtained by scanning each first voxel in the first data one by one by an initialization operator in the sparse distribution inference subnet, wherein, for the first voxel indicating a background, based on a first background value corresponding to the first voxel indicating the background, a corresponding background identifier is written into a corresponding point in a blank bitmap corresponding to the first data, and the corresponding point is a point in the blank bitmap that corresponds to the first voxel indicating the background, and wherein, for a first voxel indicating a non-background, a non-background identifier is written into a point that is in the blank bitmap and that corresponds to the first voxel indicating the non-background.

4. The method according to claim 3, wherein the at least one first background value of the first data is represented in a form of a one-dimensional array.

5. The method according to claim 2, wherein the target convolution operator is not a $1^{st}$ convolution operator in the operation subnet and the first data has a plurality of channel dimensions, and wherein a sparse distribution diagram of sub-data in each channel dimension is the same as the first sparse distribution diagram of the first data.

6. The method according to claim 5, wherein first background values of sub-data in different channel dimensions are different.

7. The method according to claim 5, wherein the at least one first background value of the first data is represented in a form of a two-dimensional array.

8. The method according to claim 1, wherein the convolutional neural network comprises an operation subnet and a sparse distribution inference subnet, and a network structure of the sparse distribution inference subnet is the same as a network structure of the operation subnet, wherein the operation subnet comprises the at least one first convolution operator, wherein the first sparse distribution diagram is from an operator that inputs the first sparse distribution diagram into a second convolution operator, and a position of the second convolution operator in the sparse distribution inference subnet corresponds to a position of the target convolution operator in the operation subnet, and wherein the at least one first background value is preconfigured for the target convolution operator.

9. The method according to claim 1, wherein intermediate results in the correspondence are results obtained through calculation on the at least one first background value at different positions of the convolution kernel, and wherein the searching, based on the background identifier of the background point that corresponds to the first voxel indicating the background in the first data in the first sparse distribution diagram, the correspondence for the intermediate result corresponding to the background identifier of the background point comprises:

for each first voxel that indicates a background in a sliding window of the first data, searching, based on a background identifier that corresponds to each first voxel indicating a background in the first sparse distribution diagram and a position of each first voxel indicating the background in the sliding window, the correspondence for the intermediate result corresponding to the background identifier at a corresponding position, wherein a size of the sliding window of the first data is the same as a size of the convolution kernel of the target convolution operator.

10. The method according to claim 1, wherein the method further comprises:

accumulating intermediate results of the first voxel that indicates a background in a sliding window of the first data, to obtain a value of one second voxel, wherein all first voxels in the sliding window of the first data indicate a background.

11. The method according to claim 1, wherein the method further comprises:

accumulating intermediate results of the first voxel that indicates a background in a sliding window of the first data, and further adding the intermediate result of a first voxel that indicates a non-background, to obtain a value of one second voxel, wherein the intermediate result of the first voxel that indicates the non-background is obtained through calculation by using a value of the first voxel that indicates the non-background and the convolution kernel.

12. The method according to claim 1, wherein the first data is a multidimensional array of video data, voice data, or text data.

13. A non-transitory computer-readable storage medium, storing one or more instructions that, when executed by at least one processor, cause the at least one processor to:

input first data, at least one first background value of the first data, and a first sparse distribution diagram of the first data into a target convolution operator of a convolutional neural network, wherein the convolutional neural network comprises at least one first convolution operator, and the target convolution operator is any one of the at least one first convolution operator, wherein the first data comprises a plurality of first voxels, the at least one first background value indicates at least one background in the first data, and the at least one first background value is in a one-to-one correspondence with the at least one background, and wherein the first sparse distribution diagram describes a sparse distribution of the plurality of first voxels by using a background identifier and a non-background identifier, the background identifier indicates that a first voxel that corresponds to the background identifier in the first data is a background, and the non-background identifier indicates that a first voxel that corresponds to the non-background identifier in the first data is a non-background;

search, based on a background identifier of a background point that corresponds to a first voxel indicating a background in the first data in the first sparse distribution diagram, a correspondence for an intermediate result corresponding to the background identifier of the background point, wherein the correspondence indicates a relationship between an intermediate result of each of the at least one first background value and a background identifier corresponding to each of the at least one first background value, the intermediate result of each first background value in the at least one first background value is obtained through calculation by using the first background value and a convolution kernel of the target convolution operator, and the intermediate result corresponding to the background identifier of the background point is used to determine a value of a second voxel in second data; and control the target convolution operator to output the second data, wherein the second data comprises a plurality of second voxels.

14. The non-transitory computer-readable storage medium according to claim 13, wherein the convolutional neural network comprises an operation subnet, a background inference subnet, and a sparse distribution inference subnet, and network structures of both the background inference subnet and the sparse distribution inference subnet are the same as a network structure of the operation subnet, wherein the operation subnet comprises the at least one first convolution operator, wherein the first sparse distribution diagram is from an operator that inputs the first sparse distribution diagram into a second convolution operator, and a position of the second convolution operator in the sparse distribution inference subnet corresponds to a position of the target convolution operator in the operation subnet, and wherein the at least one first background value is from an operator that inputs the at least one first background value into a third convolution operator, and a position of the third convolution operator in the background inference subnet corresponds to the position of the target convolution operator in the operation subnet.

15. The non-transitory computer-readable storage medium according to claim 14, wherein the target convolution operator is a $1^{st}$ convolution operator in the operation subnet and the first sparse distribution diagram is obtained by scanning each first voxel in the first data one by one by an initialization operator in the sparse distribution inference subnet, and wherein, for the first voxel indicating a background, based on a first background value corresponding to the first voxel indicating the background, a corresponding background identifier is written into a corresponding point in a blank bitmap corresponding to the first data, and the corresponding point is a point in the blank bitmap that corresponds to the first voxel indicating the background; and for a first voxel indicating a non-background, a non-background identifier is written into a point that is in the blank bitmap and that corresponds to the first voxel indicating the non-background.

16. The non-transitory computer-readable storage medium according to claim 13, wherein the convolutional neural network comprises an operation subnet and a sparse distribution inference subnet, and a network structure of the sparse distribution inference subnet is the same as a network structure of the operation subnet, wherein the operation subnet comprises the at least one first convolution operator, wherein the first sparse distribution diagram is from an operator that inputs the first sparse distribution diagram into a second convolution operator, and a position of the second convolution operator in the sparse distribution inference subnet corresponds to a position of the target convolution operator in the operation subnet, and wherein the at least one first background value is preconfigured for the target convolution operator.

17. The non-transitory computer-readable storage medium according to claim 13, wherein intermediate results in the correspondence are results obtained through calculation on the at least one first background value at different positions of the convolution kernel, and wherein the searching the correspondence for the intermediate result corresponding to the background identifier of the background point further cause the at least one processor to:

for each first voxel that indicates a background in a sliding window of the first data, search, based on a background identifier that corresponds to each first voxel indicating a background in the first sparse distribution diagram and a position of each first voxel indicating the background in the sliding window, the correspondence for the intermediate result corresponding to the background identifier at a corresponding position, wherein a size of the sliding window of the first data is the same as a size of the convolution kernel of the target convolution operator.

18. The non-transitory computer-readable storage medium according to claim 13, further cause the at least one processor to:

accumulate intermediate results of the first voxel that indicates a background in a sliding window of the first data, to obtain a value of one second voxel, wherein all first voxels in the sliding window of the first data indicate a background.

19. The non-transitory computer-readable storage medium according to claim 13, further cause the at least one processor to:

accumulating intermediate results of the first voxel that indicates a background in a sliding window of the first data, and further adding the intermediate result of a first voxel that indicates a non-background, to obtain a value of one second voxel, wherein the intermediate result of the first voxel that indicates the non-background is obtained through calculation by using a value of the first voxel that indicates the non-background and the convolution kernel.

20. A system for processing three-dimensional data, comprising:

a processor, and a memory coupled to the processor to store instructions, which when executed by the processor, cause the processor to perform operations, the operations comprising:

inputting first data, at least one first background value of the first data, and a first sparse distribution diagram of the first data into a target convolution operator of a convolutional neural network, wherein the convolutional neural network comprises at least one first convolution operator, and the target convolution operator is any one of the at least one first convolution operator, wherein the first data comprises a plurality of first voxels, the at least one first background value indicates at least one background in the first data, and the at least one first background value is in a one-to-one correspondence with the at least one background, and wherein the first sparse distribution diagram describes a sparse distribution of the plurality of first voxels by using a background identifier and a non-background identifier, the background identifier indicates that a first voxel that corresponds to the background identifier in the first data is a background, and the non-background identifier indicates that a first voxel that corresponds to the non-background identifier in the first data is a non-background;

searching, based on a background identifier of a background point that corresponds to a first voxel indicating a background in the first data in the first sparse distribution diagram, a correspondence for an intermediate result corresponding to the background identifier of the background point, wherein the correspondence indicates a relationship between an intermediate result of each of the at least one first background value and a background identifier corresponding to each of the at least one first background value, the intermediate result of each first background value in the at least one first background value is obtained through calculation by using the first background value and a convolution kernel of the target convolution operator, and the intermediate result corresponding to the background identifier of the background point is used to determine a value of a second voxel in second data; and controlling the target convolution operator to output the second data, wherein the second data comprises a plurality of second voxels.

\* \* \* \* \*